(12) United States Patent
Pan et al.

(10) Patent No.: US 8,922,976 B2
(45) Date of Patent: Dec. 30, 2014

(54) DECOUPLING DEVICE AND FABRICATING METHOD THEREOF

(75) Inventors: Yi-Hsiu Pan, Nantou County (TW); Yu-Ting Cheng, Hsinchu (TW); Li-Duan Tsai, Hsinchu (TW); Chi-Lun Chen, Taipei (TW); Cheng-Liang Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 319 days.

(21) Appl. No.: 13/350,813

(22) Filed: Jan. 15, 2012

(65) Prior Publication Data
US 2013/0120903 A1 May 16, 2013

(30) Foreign Application Priority Data

Nov. 10, 2011 (TW) .............................. 100141045 A

(51) Int. Cl.
| | |
|---|---|
| H01G 4/228 | (2006.01) |
| H01G 5/38 | (2006.01) |
| H01G 9/048 | (2006.01) |
| H01G 9/15 | (2006.01) |
| H01G 9/26 | (2006.01) |
| H01G 9/08 | (2006.01) |

(52) U.S. Cl.
CPC ................ *H01G 9/048* (2013.01); *H01G 9/15* (2013.01); *H01G 9/26* (2013.01); *H01G 9/08* (2013.01)
USPC ........................... 361/541; 361/540; 29/25.03

(58) Field of Classification Search
USPC ........................ 361/541, 540, 535, 539, 528
See application file for complete search history.

(56) References Cited

U.S. PATENT DOCUMENTS

| | | | | |
|---|---|---|---|---|
| 6,333,844 B1 * | 12/2001 | Nakamura | .................... | 361/523 |
| 6,920,035 B2 | 7/2005 | Nagasawa et al. | | |
| 6,970,344 B2 * | 11/2005 | Arai et al. | ...................... | 361/528 |
| 7,206,193 B2 | 4/2007 | Nagasawa et al. | | |
| 7,326,261 B2 | 2/2008 | Nagasawa et al. | | |
| 7,433,175 B2 | 10/2008 | Asami et al. | | |
| 7,551,424 B2 | 6/2009 | Kuriyama | | |
| 7,800,462 B2 * | 9/2010 | Kurita et al. | .................. | 333/185 |
| 2010/0214038 A1 | 8/2010 | Kurita et al. | | |
| 2012/0099247 A1 * | 4/2012 | Lin et al. | ....................... | 361/536 |

FOREIGN PATENT DOCUMENTS

| | | |
|---|---|---|
| JP | U1985018537 | 2/1985 |
| JP | 64-37006 | 2/1989 |
| JP | U1990062716 | 5/1990 |
| JP | 09-007891 | 1/1997 |
| JP | 9-232196 | 9/1997 |

(Continued)

*Primary Examiner* — Eric Thomas
(74) *Attorney, Agent, or Firm* — Jianq Chyun IP Office

(57) ABSTRACT

A decoupling device including a lead frame, multiple capacitor units, a protective layer and a packaging element is provided. The lead frame includes a cathode terminal portion and at least two opposite anode terminal portions disposed at two ends of the cathode terminal portion. The two anode terminal portions are electrically connected with each other through a conductive line. The capacitor units are connected in parallel and disposed on the lead frame. Each capacitor unit has a cathode portion and an opposite anode portion. The cathode portion is electrically connected with the cathode terminal portion. The anode portion is electrically connected with the anode terminal portion. The protective layer wraps at least one of the anode portion and the cathode portion of the capacitor unit. The packaging element covers the lead frame, the capacitor units and the protective layer. The packaging element exposes a bottom surface of the lead frame.

23 Claims, 28 Drawing Sheets

(56) References Cited

FOREIGN PATENT DOCUMENTS

| JP | 2002-110461 | 4/2002 |
|----|-------------|--------|
| JP | 2006-179886 | 7/2006 |
| JP | 2009-076651 | 4/2009 |
| JP | 2009-238961 | 10/2009 |
| JP | 2009-252764 | 10/2009 |
| JP | 2010-027900 | 2/2010 |
| JP | 2010-087001 | 4/2010 |
| JP | 2010-226139 | 10/2010 |
| WO | 2010026808 | 3/2010 |

* cited by examiner

DECOUPLING DEVICE AND FABRICATING METHOD THEREOF

CROSS-REFERENCE TO RELATED APPLICATION

This application claims the priority benefit of Taiwan application serial no. 100141045, filed Nov. 11, 2011. The entirety of the above-mentioned patent application is hereby incorporated by reference herein and made a part of this specification.

TECHNICAL FIELD

The disclosure relates to a decoupling device, and more particularly to a decoupling device with good device characteristics.

BACKGROUND

A solid electrolytic capacitor has such advantages as small dimension, large capacitance, and superior frequency characteristics, and can play a role of decoupling for a power source circuit of a Central Processing Unit (CPU).

Generally, a plurality of capacitor units can be stacked on a lead frame to form a solid electrolytic capacitor having a high capacitance. FIG. 25 is a local schematic view of a solid electrolytic capacitor. Referring to FIG. 25, in a solid electrolytic capacitor 400, multiple capacitor units 410 are stacked on a lead frame 420. Each capacitor unit 410 has a cathode portion 412 and an anode portion 414. The lead frame 420 has a cathode terminal 422 and an anode terminal 424. After the stacking is completed, multiple anode portions 414 are electrically connected with anode terminals 424 through anode solder joints 430. However, the solid electrolytic capacitor 400 further needs to perform subsequent heat treatment test, and in this case, external water vapor W and heat energy H easily enable the anode solder joints 430 to be oxidized, be insulated, or peel, resulting in an undesirable electrically connection between the multiple anode portions 414, and capacitance will be greatly reduced at an equal proportion.

Furthermore, if the external water vapor W infiltrates into a cathode portion 412 of the capacitor unit 410, problems that false capacitance and energy consumed by the solid electrolytic capacitor 400 within unit time due to heat generation (DF, Dissipation Factor) are increased, and reliability of the solid electrolytic capacitor 400 is reduced are caused.

SUMMARY

An embodiment of the disclosure provides a decoupling device, which has a protective layer protecting internal elements, is capable of preventing external water vapor and oxygen from damaging internal elements of the decoupling device, thereby enabling the decoupling device to have good device characteristics.

An embodiment of the disclosure proposes a decoupling device fabricating method, which is capable of fabricating the foregoing decoupling device.

A decoupling device of an embodiment of the disclosure includes a lead frame, multiple capacitor units, a protective layer and a packaging element. The lead frame includes a cathode terminal portion and at least two opposite anode terminal portions disposed at two ends of the cathode terminal portion. The two anode terminal portions are electrically connected with each other through a conductive line. The plurality of capacitor units is connected in parallel and disposed on the lead frame. Each capacitor unit has a cathode portion and an anode portion opposite to each other. The cathode portion of the capacitor unit is electrically connected with the cathode terminal portion. The anode portion of the capacitor unit is electrically connected with the anode terminal portion. The protective layer wraps at least one of the anode portion and the cathode portion of the capacitor unit. The packaging element covers the lead frame, the capacitor units and the protective layer, and the packaging element exposes a bottom surface of the lead frame.

An embodiment of the disclosure further provides a decoupling device fabricating method. First, a lead frame is provided, which includes a cathode terminal portion and at least two opposite anode terminal portions disposed at two ends of the cathode terminal portion. The two anode terminal portions are electrically connected with each other through a conductive line. Then, a plurality of capacitor units is provided, and these capacitor units are connected in parallel and disposed on the lead frame. Each capacitor unit has a cathode portion and an anode portion opposite to each other. The cathode portion of the capacitor unit is electrically connected with the cathode terminal portion. The anode portion of the capacitor unit is electrically connected with the anode terminal portion. Subsequently, a protective layer is provided, which wraps at least one of the anode portion and the cathode portion of the capacitor unit. Afterwards, a packaging element is provided, which covers the lead frame, the capacitor units and the protective layer, and the packaging element exposes a bottom surface of the lead frame.

Based on the above description, the decoupling device of the disclosure has a protective layer, and this protective layer is applied to at least one of an anode portion and a cathode portion of a capacitor unit, so as to prevent a problem that anode solder joints are oxidized under a high-temperature and high-humidity condition, and prevent a phenomenon of false capacitance caused by that water vapor infiltrates into a spacing between a conductive polymer layer and a dielectric layer of the capacitor unit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 16A to FIG. 16C are schematic views of yet another decoupling device having a multi-terminal structure according to an embodiment of the disclosure, in which, FIG. 16A is a schematic view of a lead frame of the decoupling device, FIG. 16B is a schematic view that a plurality of capacitor units on the same plane is arrayed on the lead frame, and FIG. 16C is a schematic view of the decoupling device observed from the bottom surface.

FIG. 17A to FIG. 17C are schematic views of still another decoupling device having a multi-terminal structure according to an embodiment of the disclosure, in which, FIG. 17A is a schematic view of a lead frame of the decoupling device, FIG. 17B is a schematic view that a plurality of capacitor units on the same plane is arrayed on the lead frame, and FIG. 17C is a schematic view of the decoupling device observed from the bottom surface.

DETAILED DESCRIPTION OF DISCLOSED EMBODIMENTS

A decoupling device of an embodiment of the disclosure includes a lead frame, multiple capacitor units, a protective layer and a packaging element. The lead frame includes a cathode terminal portion and at least two opposite anode terminal portions disposed at two ends of the cathode terminal portion. The two anode terminal portions are electrically connected with each other through a conductive line. The plurality of capacitor units is connected in parallel and disposed on the lead frame. Each capacitor unit has a cathode portion and an anode portion opposite to each other. The cathode portion of the capacitor unit is electrically connected with the cathode terminal portion. The anode portion of the capacitor unit is electrically connected with the anode terminal portion. The protective layer wraps at least one of the anode portion and the cathode portion of the capacitor unit. The packaging element covers the lead frame, the capacitor units and the protective layer, and the packaging element exposes a bottom surface of the lead frame.

The protective layer is used to protect at least one of the anode portion and the cathode portion of the capacitor units connected in parallel with each other, thereby being capable of avoiding the influence caused by external water vapor and heat energy on the capacitor units.

Additionally, the decoupling device according to the embodiment of the disclosure may adopt a manner that the plurality of capacitor units is arrayed on the same plane and connected with each other in parallel, or a manner that the plurality of capacitor units is staggered, stacked and arrayed in parallel with each other, has a simple manufacturing process, and can reduce an ESR.

Furthermore, the capacitor unit adopts a sheet unit electrode having the cathode portion and the anode portion rather than a through type unit electrode, so the manufacturing process is simple. The at least two anode terminal portions of the lead frame are communicated with each other to form a transmission line structure, and this transmission line structure forms an inductor in a high frequency state. The inductor can form a filter together with a capacitor of the capacitor unit.

Moreover, the lead frame can have a multi-terminal structure, and shorten a current transmission distance between adjacent terminals, so as to reduce an Equivalent Series Inductance (ESL). Hereinafter, several embodiments are listed to further illustrate technical contents of the disclosure.

[Decoupling Device of Capacitor Units Arrayed in Parallel on the Same Plane]

Figure 1A:
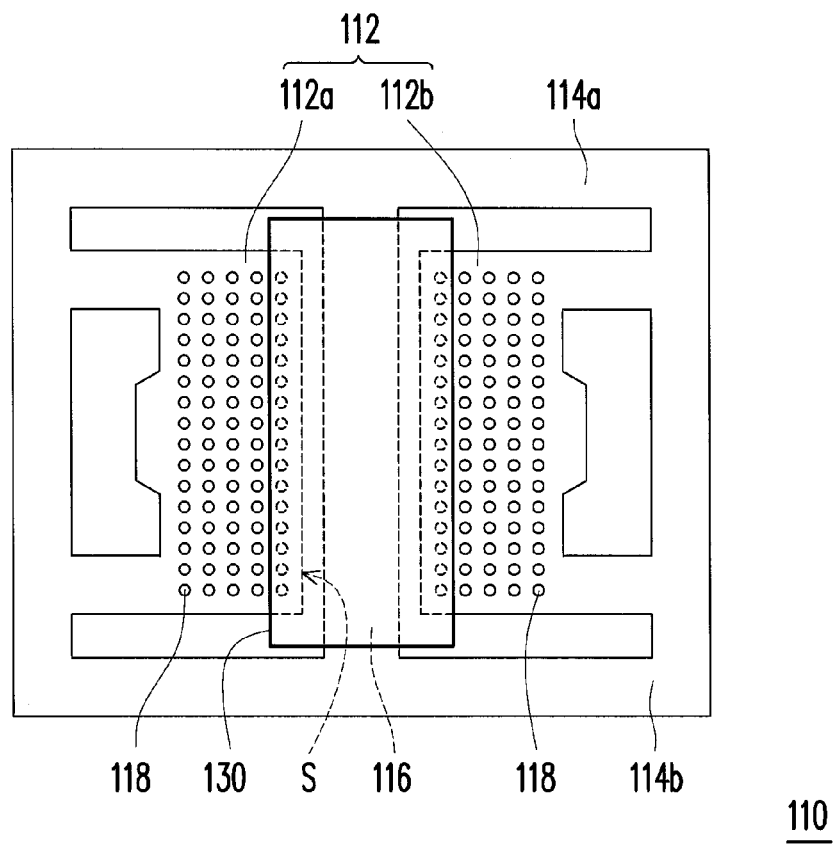
FIG. 1A to FIG. 1C are schematic views of a lead frame and capacitor units of a decoupling device according to an embodiment of the disclosure.
Figure 1B:
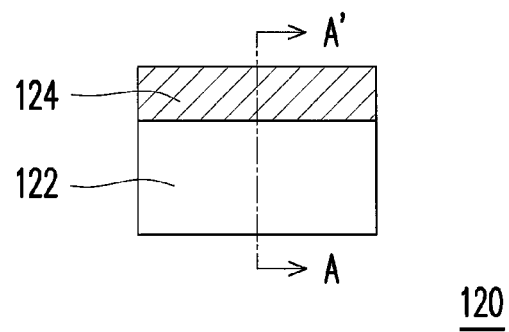
Figure 1C:
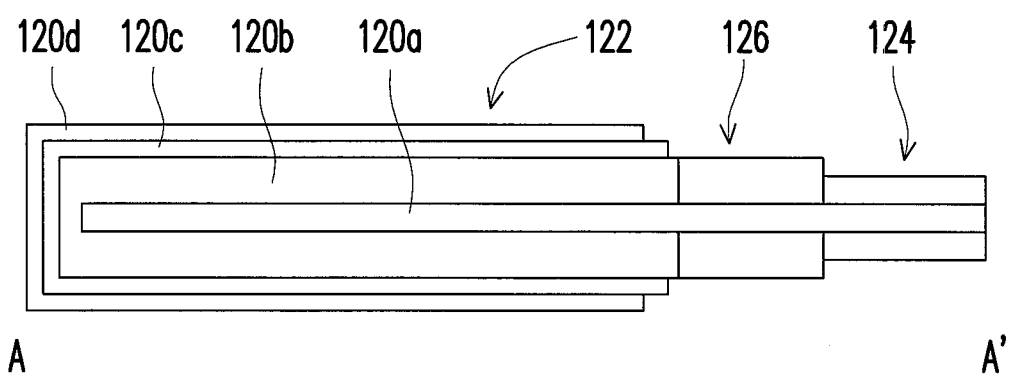
Figure 2A:
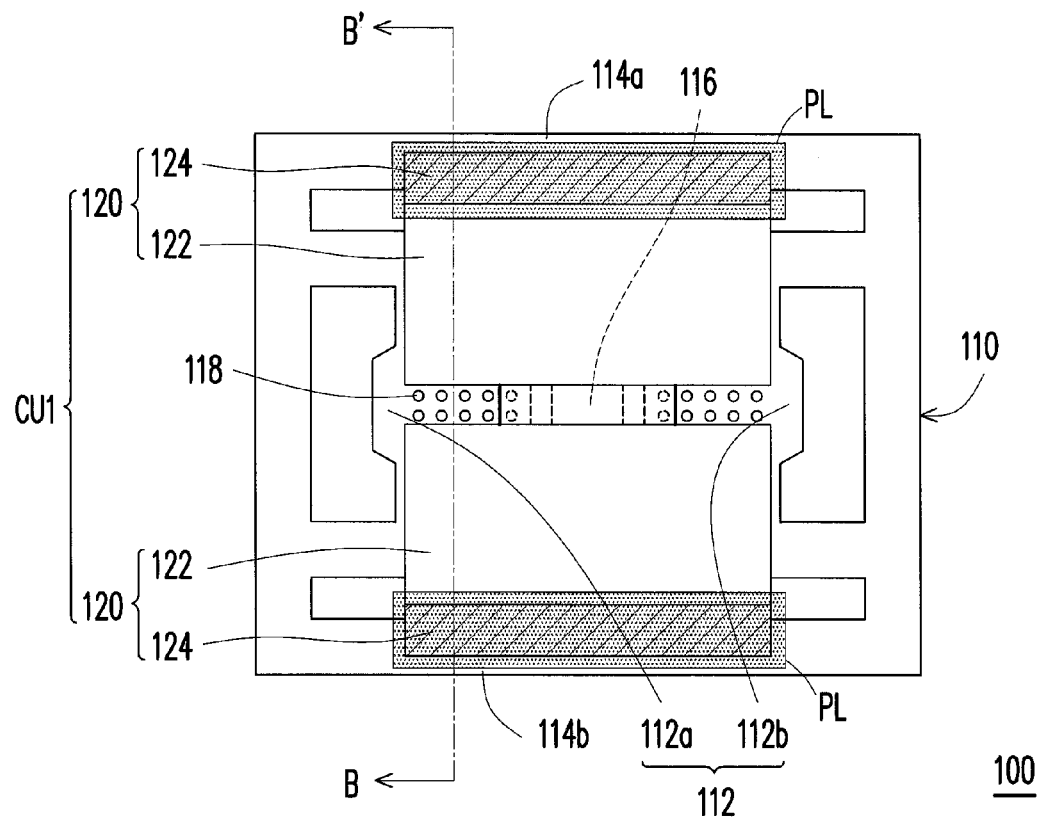
FIG. 2A and FIG. 2B are schematic views of a decoupling device and an equivalent circuit thereof respectively according to an embodiment of the disclosure, in which, the capacitor units arrayed on the same plane are disposed on the lead frame.
Figure 2B:
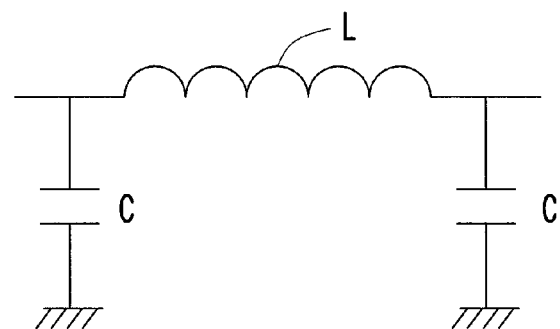

FIG. 1A to FIG. 1C are schematic views of a lead frame and capacitor units of a decoupling device according to an embodiment of the disclosure. FIG. 2A and FIG. 2B are schematic views of a decoupling device and an equivalent circuit thereof respectively according to an embodiment of the disclosure, and in this embodiment, multiple capacitor units 120 may be located on the same plane, arrayed in parallel with each other, and disposed on a lead frame 110.

Referring to FIG. 1A to FIG. 1C, and FIG. 2A to FIG. 2B simultaneously, a decoupling device 100 includes a lead frame 110 and a plurality of capacitor units 120. The lead frame 110 includes: a cathode terminal portion 112, and at least two anode terminal portions 114a and 114b disposed at two ends of the cathode terminal portion 112 and opposite to each other. The two anode terminal portions 114a and 114b are electrically connected to each other through a conductive line 116. The capacitor units 120 are disposed on the lead frame 110. Each capacitor unit 120 has a cathode portion 122 and an anode portion 124 opposite to each other.

The capacitor units 120 are arrayed into a first capacitor unit assembly CU1 in a manner of N pieces as one group (N is equal to 2 in FIG. 2) on the same plane. The capacitor units 120 of the first capacitor unit assembly CU1 are connected in parallel, and N is larger than or equal to 2. A number of the capacitor units 120 can be an even number. The cathode portions 122 of the capacitor units 120 are electrically connected with the cathode terminal portion 112. The anode portions 124 of the capacitor units 120 are electrically connected with the anode terminal portions 114a and 114b.

Referring to FIG. 1A continuously, the cathode terminal portion 112 can have a spacing S, and the conductive line 116 is disposed in the spacing S. The spacing S can divide the cathode terminal portion 112 into two sub cathode terminal portions 112a and 112b, so as to enable the conductive line 116 to be located in the spacing S between the two sub cathode terminal portions 112a and 112b. In this way, the cathode terminal portion 112, the anode terminal portions 114a and 114b and the conductive line 116 of the lead frame 110 can be located at the same plane, so it can be ensured that cathode portions 122 and anode portions 124 of a plurality of capacitor units 120 can be located on the same plane of the lead frame 110. As a result, the yield of a plurality of subsequent capacitor units 120 electrically connected with each other can be enhanced.

Additionally, the cathode terminal portion 112 can further include a rough structure 118 located at a surface of the cathode terminal portion 112. The rough structure 118 can enhance the attachment effect between the capacitor unit 120 and the cathode terminal portion 112. The rough structure 118 can be formed by performing a molding process on the cathode terminal portion 112. Furthermore, the decoupling device 100 can further include an insulating layer 130 disposed above the conductive line 116, and the insulating layer 130 enables the cathode terminal portion 112 and the anode terminal portions 114a and 114b to be electrically insulated from each other. Generally, the insulating layer 130 can be formed by attaching an insulating adhesive tape on an appropriate position of the lead frame 110.

Referring to FIG. 1B and FIG. 1C, the capacitor unit 120 can be a sheet capacitor unit, and have one cathode portion 122 and one anode portion 124 at two opposite ends respectively. An internal structure of the capacitor unit 120 can be seen from a section line A-A' of the capacitor unit 120, that is, the capacitor unit 120 can include a valve metal layer 120a, a dielectric layer 120b, a conductive polymer layer 120c, and a cathode conductive layer 120d. The dielectric layer 120b is formed on the valve metal layer 120a. The conductive polymer layer 120c is formed on the dielectric layer 120b. The cathode conductive layer 120d is formed on the conductive polymer layer 120c.

The material of the valve metal layer 120a may be selected from aluminium, tantalum, niobium, niobium oxide, titanium and a combination thereof. The dielectric layer 120b may be formed by applying a dielectric material onto the valve metal layer 120a. The dielectric layer 120b is also a metal oxide formed by oxidizing a surface of the valve metal layer 120a through chemical anode treatment.

Additionally, in the capacitor unit 120, an insulating portion 126 can be disposed between the cathode portion 122 and the anode portion 124, so as to isolate the cathode portion 122 from the anode portion 124.

Referring to FIG. 2A, in the decoupling device 100, a plurality of capacitor units 120 is arrayed into a first capacitor unit assembly CU1 in a manner of N pieces as one group (N is equal to 2 in FIG. 2) on the same plane, and the capacitor units 120 are connected with each other in parallel. Two capacitor units 120 in the first capacitor unit assembly CU1 are arrayed on the same plane instead of being stacked with each other. In the disclosure, the so-called "the same plane" refers to that: all capacitor units 120 in the first capacitor unit assembly CU1 are arrayed in the same layer.

It can be seen in FIG. 2A that, for the two capacitor units 120 located above and below the picture in FIG. 2A, their respective cathode portions 122 are adjacent to each other, while their respective anode portions 124 are far away from each other. The cathode portions 122 can almost cover all area of the cathode terminal portion 112 to achieve a good electrical connection effect. Accordingly the decoupling device 100 adopts a manner that a plurality of capacitor units 120 is arrayed on the same plane and connected with each other in parallel, has a rather simple manufacturing process, and can effectively reduce an ESR.

As shown in FIG. 2A, a decoupling device 100 has a protective layer PL, which wraps at least one of the anode portion 124 and the cathode portion 122 of the capacitor unit 120. FIG. 2A only shows that the protective layer PL wraps the anode portion 124 of the capacitor unit 120. Practically, the protective layer PL may also wrap the anode portion 124 and the cathode portion 122 simultaneously; or the protective layer PL may also only wrap the anode portion 124.

The material of the protective layer PL may be selected from silicon resin, silicon rubber, epoxy resin, polyimide, polytetrafluoroethylene, polyurethane, liquid crystal plastic and a combination thereof. The protective layer PL may prevent the problem that the anode solder joints are oxidized under the high-temperature and high-humidity condition, and may ensure good electrical connection between the anode portions 124. Moreover, the protective layer PL may further prevent water vapor from infiltrating into a spacing between the conductive polymer layer 120c and the dielectric layer 120b of the capacitor unit 120, and avoid the generating of false capacitance phenomenon.

Additionally, as shown in an equivalent circuit diagram in FIG. 2B, a transmission line structure formed by a conductive line 116 generates an inductor L in a high frequency operation state, and this inductor L and capacitors C of the two capacitor units 120 form a CLC circuit, that is, a so-called π filter. In this way, an electronic noise can be effectively removed during the high frequency operation.

Figure 3:
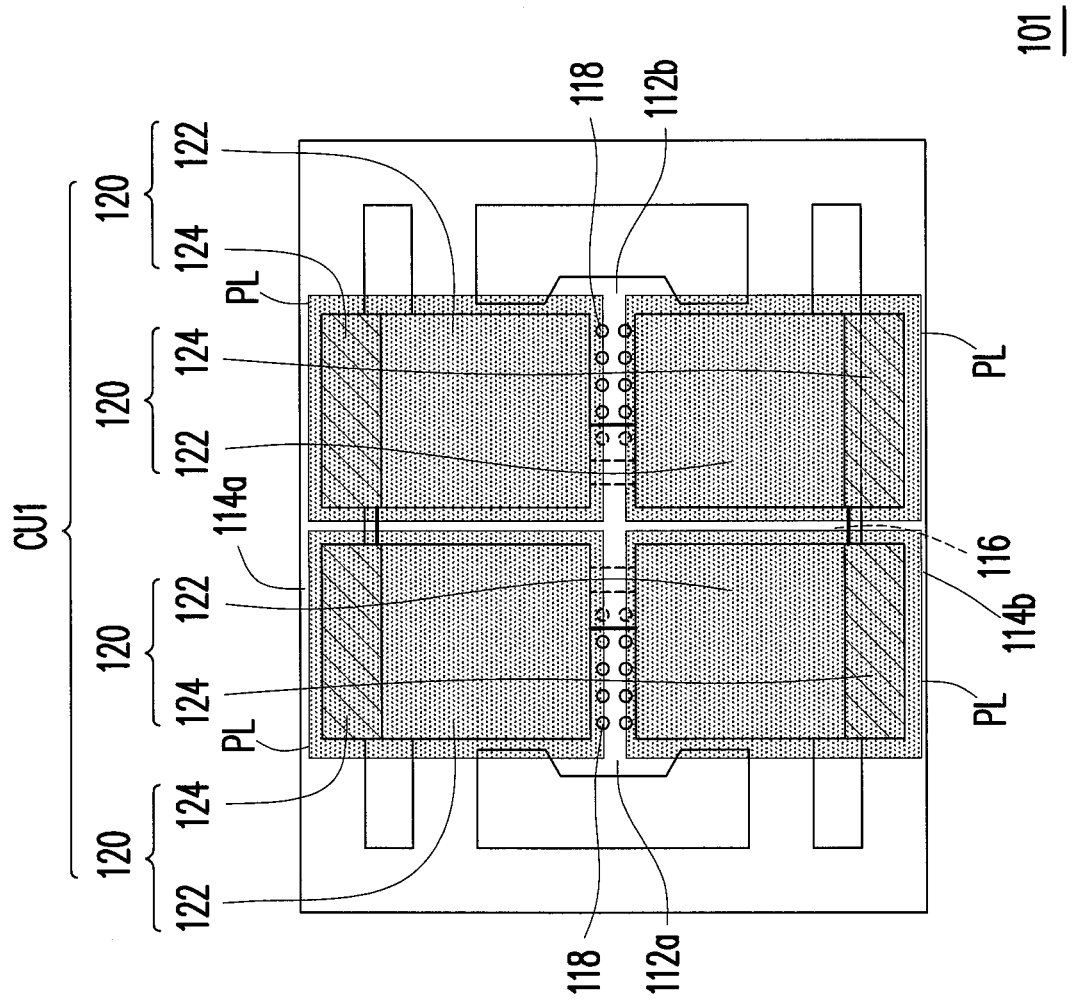
FIG. 3 is a schematic view of another decoupling device according to an embodiment of the disclosure.

FIG. 3 is a schematic view of another decoupling device according to an embodiment of the disclosure. Referring to FIG. 3, a decoupling device 101 is similar to the decoupling device 100 as shown in FIG. 2A, and the same devices are labelled with the same symbols. The decoupling device of FIG. 3 also has a protective layer PL. In the embodiment of FIG. 3, the protective layer PL shows a situation of simultaneously wrapping the cathode portion 122 and the anode portion 124 of the capacitor unit 120.

As shown in FIG. 3, the multiple capacitor units 120 are arrayed into a first capacitor unit assembly CU1 in a manner of N pieces as one group (N is equal to 4 in FIG. 3) on the same plane, and the capacitor units 120 of the first capacitor unit assembly CU1 are connected in parallel. In this way, an appropriate number of capacitor units 120 can be randomly arrayed on the lead frame 110 in a manner of arraying on the same plane, so as to obtain a decoupling device with a required capacitance value. The manner of arraying the plurality of capacitor units 120 on the same plane is rather simple, so the manufacturing process efficiency can be enhanced.

Figure 4:
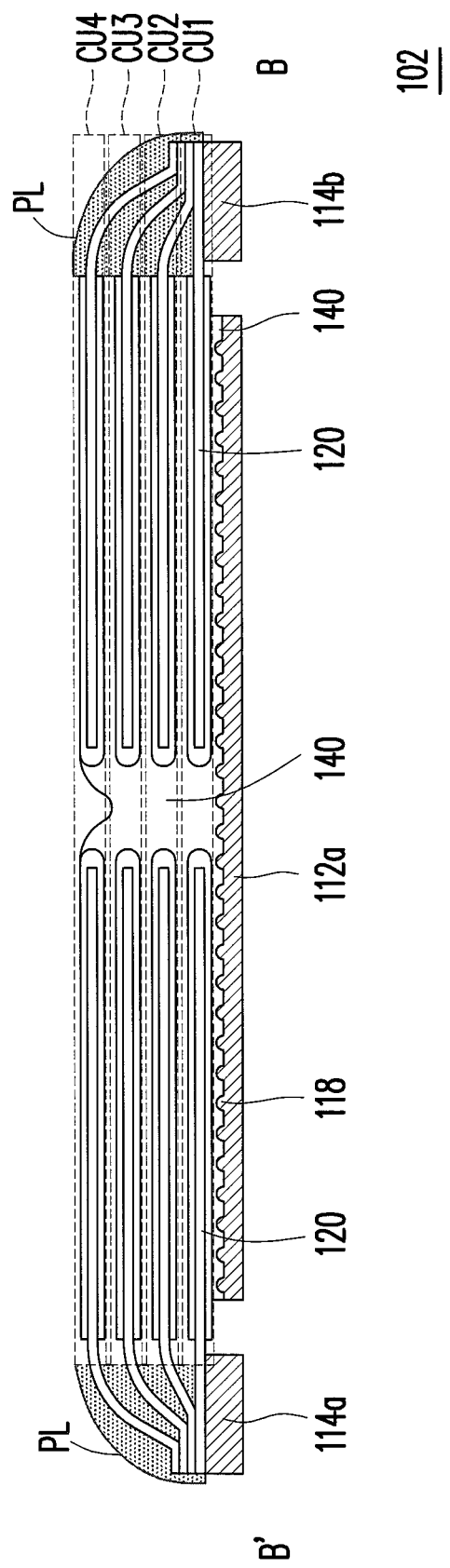
FIG. 4 is a schematic sectional view of yet another decoupling device according to an embodiment of the disclosure, and the section in FIG. 4 is obtained by observing in a direction of the line B-B' in FIG. 2A.

FIG. 4 is a schematic sectional view of yet another decoupling device according to an embodiment of the disclosure, and the section in FIG. 4 is obtained by observing in a direction of the line B-B' in FIG. 2A. Referring to FIG. 4, when multiple capacitor unit assemblies exist, the capacitor unit assemblies are arrayed in a stacked manner. More specifically, in the decoupling device 102, capacitor units 120 can be arrayed into a second capacitor unit assembly CU2 on the same plane in a manner of N pieces as one group, the capacitor units 120 of the second capacitor unit assembly CU2 are connected in parallel, and the second capacitor unit assembly CU2 is stacked on the first capacitor unit assembly CU1.

That is to say, multiple groups of capacitor unit assemblies can be stacked in a normal direction of the plane of the lead frame 110, and a number of the stacked capacitor unit assemblies is optional. As shown in FIG. 4, capacitor unit assemblies CU2 to CU4 can be stacked above the first capacitor unit assembly CU1 with each other, that is, totally four groups of capacitor unit assemblies CU1 to CU4 are stacked, so as to obtain the decoupling device 102 with a large capacitance.

Referring to FIG. 4 again, the capacitor units 120 can be electrically connected with each other with a conductive adhesive 140. Furthermore, the conductive adhesive 140 can cooperate with the rough structure 118 on a cathode terminal portion 112a, so that the capacitor unit 120 and the cathode terminal portion 112a form the good attachment. The protective layer PL covers a spacing between the anode portions 124 stacked and electrically connected with each other, can prevent water vapor and heat energy from outside entering the anode solder joints between the anode portions 124, and may ensure that good electrical connection characteristics exist between the multiple capacitor units 120.

Figure 5:
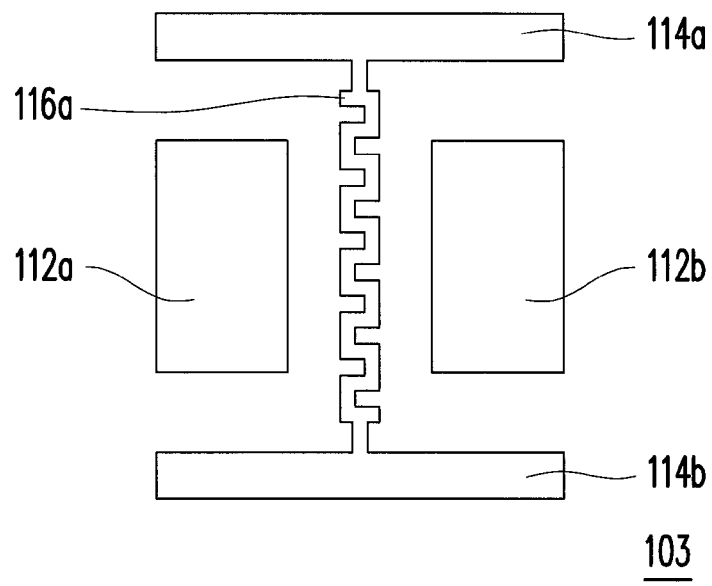
FIG. 5 is a schematic view of a decoupling device according to another embodiment of the disclosure, in which the capacitor unit is omitted.

Additionally, the value of the inductor formed by the conductive line 116 can further be regulated according to the design requirement. FIG. 5 is a schematic view of a decoupling device according to another embodiment of the disclosure, in which capacitor units are omitted. Referring to FIG. 5, in this decoupling device 103, a conductive line 116a can be of a consecutive bending structure. The conductive line 116a of this consecutive bending structure can be formed in such manners as stamping or etching. The consecutive bending structure can be of a shape which can increase the total length of the conductive line 116 with a sin wave, a square wave, or a zigzag wave, and thereby, the total length and the area of the conductive line 116a can be adjusted, so as to regulate the inductance value of the decoupling device 103 in a case of high frequency operation.

Figure 6:
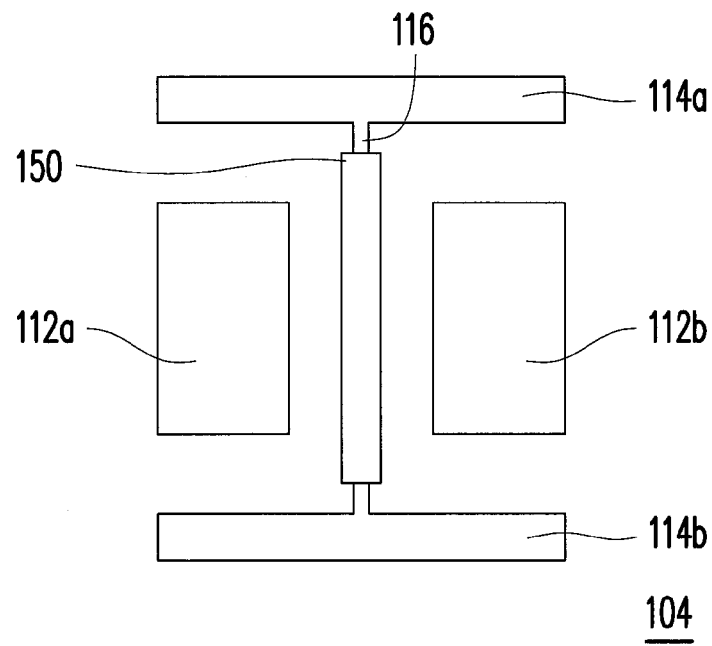
FIG. 6 is a schematic view of a decoupling device according to yet another embodiment of the disclosure, in which the capacitor unit is omitted.

FIG. 6 is a schematic view of a decoupling device according to yet another embodiment of the disclosure, in which capacitor units are omitted. Referring to FIG. 6, this decoupling device 104 can further include a device 150 having inductance characteristics, which is connected with a conductive line 116 in series or in parallel. This device 150 having the inductance characteristics is, for example, a chip inductor. Thereby, the inductance value of the decoupling device 104 can be regulated in a case of high frequency operation.

Figure 7:
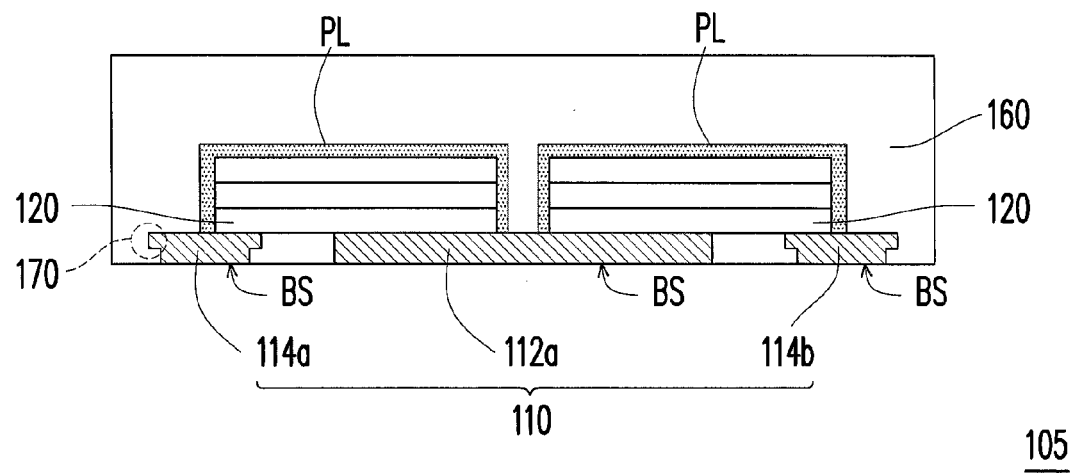
FIG. 7 is a schematic sectional view of a decoupling device according to still another embodiment of the disclosure.

FIG. 7 is a schematic sectional view of a decoupling device according to still another embodiment of the disclosure. Referring to FIG. 7, a decoupling device 105 may include: a packaging element 160, which covers a lead frame 110, capacitor units 120 and a protective layer PL, and the packaging element 160 exposes a bottom surface of the lead frame 110.

In FIG. 7, the protective layer PL wraps multiple capacitor units 120 stacked on each other, and the packaging element 160 further wraps the protective layer PL, that is, the protective layer PL is located between the packaging element 160 and these capacitor units 120. The packaging element 160 may also be used in the decoupling devices 100 to 104, so as to wrap the decoupling devices 100 to 104 having the protective layer PL.

In the embodiment of FIG. 7, the packaging element 160 may be a packaging layer (that is, a film layer formed with packaging resin). The packaging element 160 (packaging layer) partially wraps these capacitor units 120 and the lead frame 110, and the packaging element 160 (packaging layer) exposes bottom surfaces BS of the cathode terminal portion 112a and the anode terminal portions 114a and 114b. The capacitor unit 120 and, the lead frame 110 may be integrated into a device through the packaging element 160 (packaging layer). In the embodiment of FIG. 7, through the cooperation of the packaging element 160 (packaging layer) and the protective layer PL, in addition to having a protective role provided by the protective layer PL, the decoupling device 105 is enabled to further have a protective role of isolating external air and water vapor provided by the packaging element 160.

Additionally, the packaging element 160 (packaging layer) may wholly cover these capacitor units 120, so the protective layer PL may only be disposed on a position where the decoupling device 105 needs to strengthen protecting, thereby saving the material cost.

Figure 8:
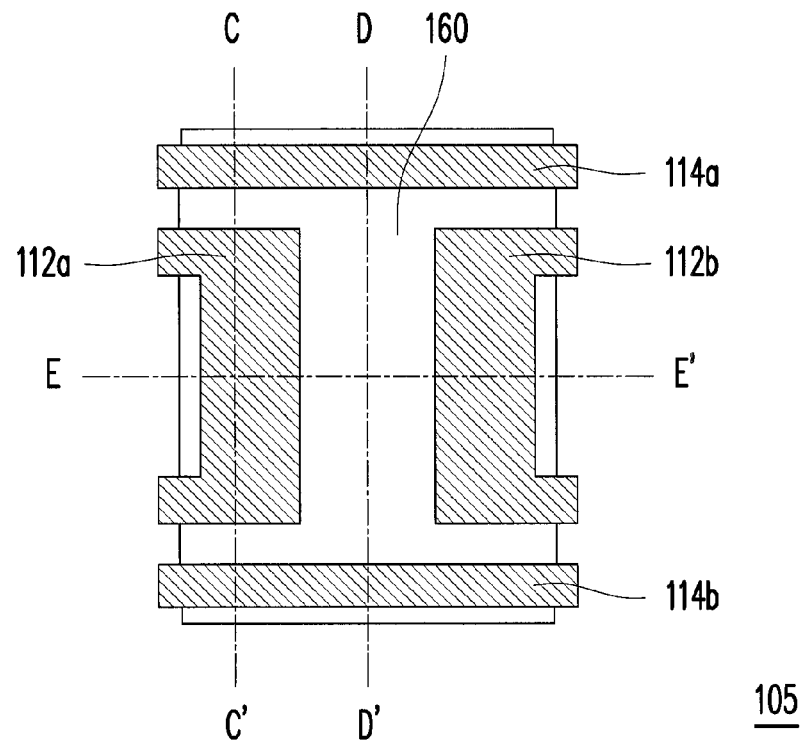
FIG. 8 is a schematic view of the decoupling device observed from the bottom surface in FIG. 7.
Figure 9A:
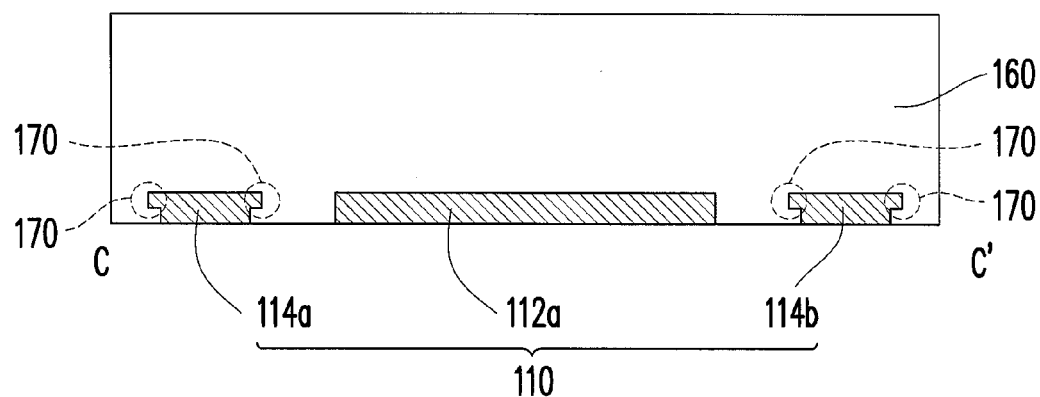
FIG. 9A to FIG. 9C are schematic sectional views along the line C-C', the line D-D' and the line E-E' in FIG. 8 respectively, and the capacitor unit is omitted in FIG. 9A to FIG. 9C.
Figure 9B:
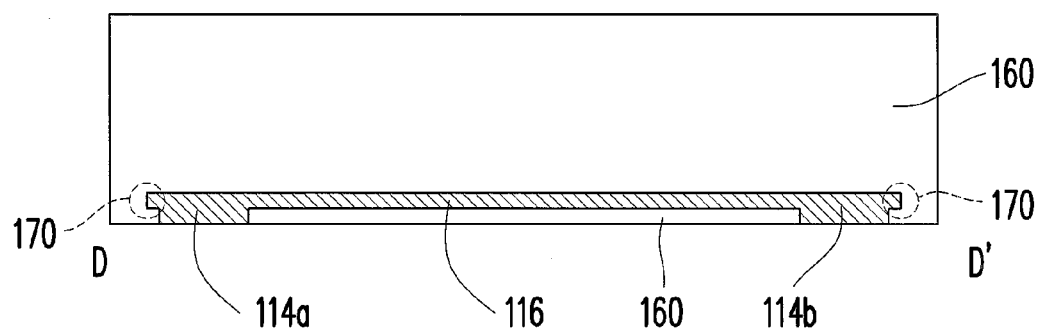
Figure 9C:
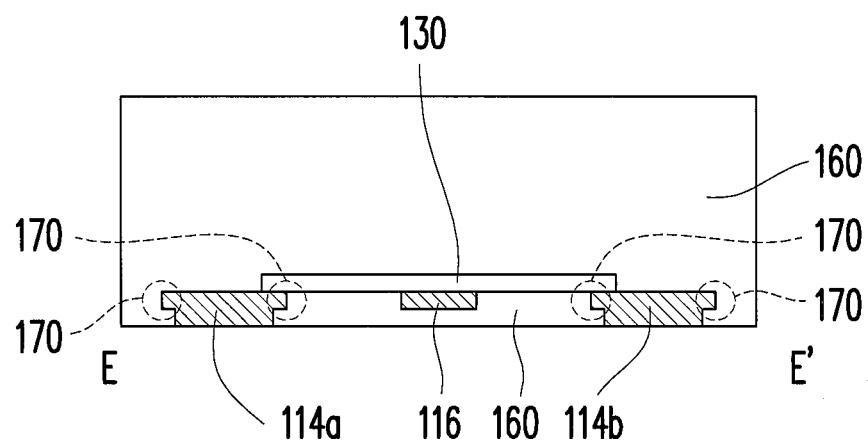

FIG. 8 is a schematic view of the decoupling device observed from the bottom surface in FIG. 7. FIG. 9A to FIG. 9C are schematic sectional views along the line C-C, the line D-D' and the line E-E' in FIG. 8 respectively, and capacitor units are omitted in FIG. 9A to FIG. 9C.

Referring to FIG. 7, FIG. 8, and FIG. 9A to FIG. 9C simultaneously, in the decoupling device 105, the sub cathode terminal portions 112a and 112b and the anode terminal portions 114a and 114b can each further include an engaging structure 170, which is disposed at edges of the sub cathode terminal portions 112a and 112b and edges of the anode terminal portions 114a and 114b, and the engaging structures 170 are engaged in the packaging element 160 (packaging layer).

The engaging structures 170 can enable the lead frame 110 to be more stably fixed in the packaging element 160 (packaging layer), thereby increasing the wrapping effect and the stability of the packaging layer for the lead frame 110 and the capacitor unit 120. The engaging structures 170 are formed by, for example, pressing the edges of the cathode terminal portions 112a and 112b and the edges of the anode terminal portions 114a and 114b.

Additionally, as shown in FIG. 9C, the packaging element 160 (packaging layer) can completely wrap the conductive line 116. However, in another embodiment, the packaging element 160 can also expose part of the conductive line 116 (not shown). In the embodiment that the packaging element 160 exposes a part of the conductive line 116, a device 150 having inductance characteristics can be disposed on the exposed conductive line 116 easily with the technology as shown in FIG. 6, so as to regulate the inductance.

Figure 10:
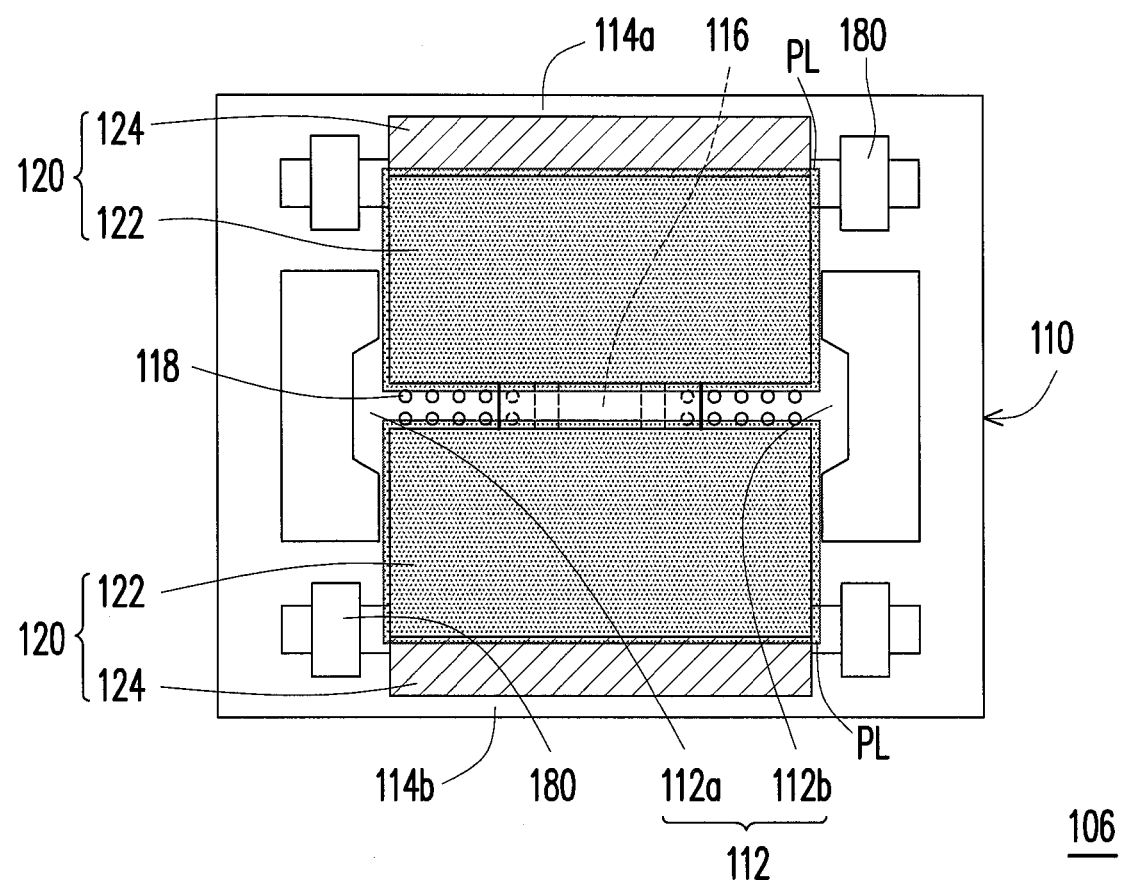
FIG. 10 is a schematic view of still another decoupling device according to an embodiment of the disclosure.

FIG. 10 is a schematic view of still another decoupling device according to an embodiment of the disclosure. Referring to FIG. 10, a decoupling device 106 also includes a protective layer PL, and the decoupling device 106 of FIG. 10 for example only wraps a cathode portion 122 of a capacitor unit 120. The decoupling device 106 may further include at least one ceramic capacitor 180 (four as shown in FIG. 10), which are connected in parallel between the cathode terminal portions 112a and 112b and the anode terminal portions 114a and 114b. With the additional ceramic capacitors 180 connected in parallel, the capacitance of the decoupling device 106 can be regulated according to the design requirement.

Figure 11:
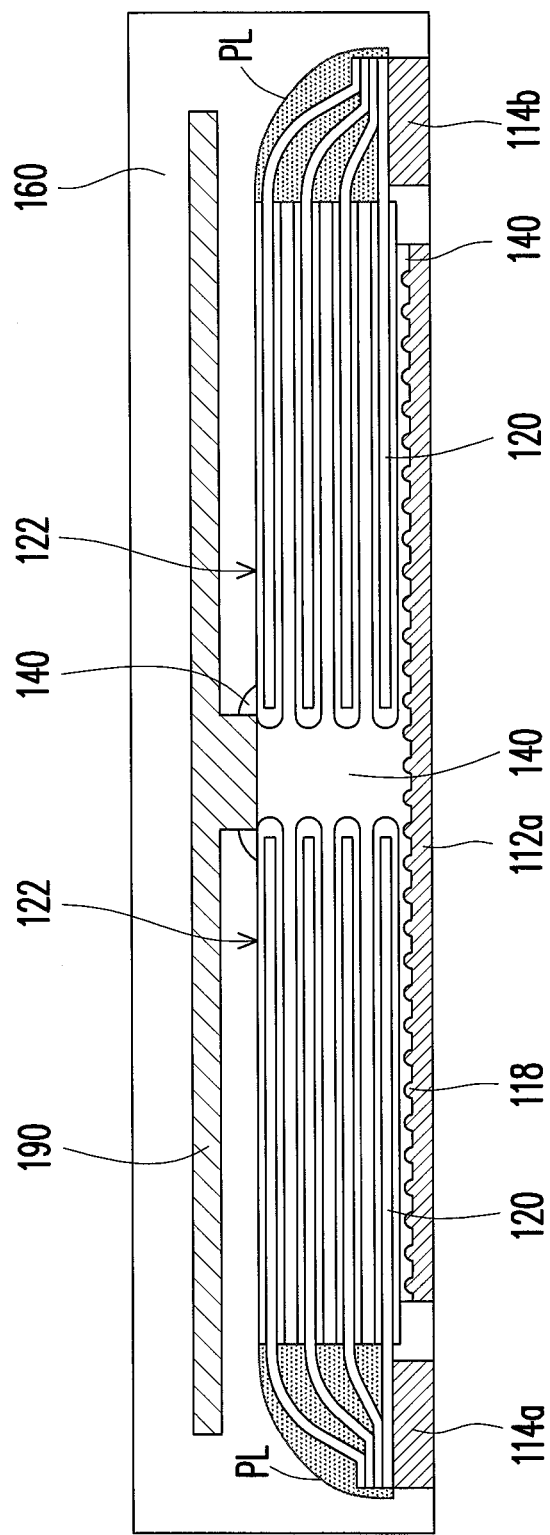
FIG. 11 is a schematic view of yet another decoupling device according to an embodiment of the disclosure.

FIG. 11 is a schematic view of yet another decoupling device according to an embodiment of the disclosure. Referring to FIG. 11, a decoupling device 107 in FIG. 11 is similar to the decoupling device 102 in FIG. 4. The decoupling device 107 further includes an electromagnetic wave baffle plate 190, which covers capacitor units 120 at the above of the capacitor units 120. With the electromagnetic wave baffle plate 190, the electromagnetic wave interference of the outside electromagnetic wave to the decoupling device 107 can be isolated. The electromagnetic wave baffle plate 190 can be a metal plate.

Referring to FIG. 11 again, the electromagnetic wave baffle plate 190 can be of a mask type (a reflective type), an absorptive type, or a multilayer composite structure combining the mask type and the absorptive type, which can be made of, for example, a metal material, a conductive polymer material, a magnetic metal oxide, or a nano-scale composite material, so as to isolate the interference of the outside electromagnetic wave to the decoupling device 107. The electromagnetic wave baffle plate 190 can also block the electromagnetic wave generated by the internal power source signal transmission of the decoupling device 107, so as to prevent the electromagnetic wave from interfering an active device (not shown) located outside the decoupling device 107. As shown in FIG. 11, the electromagnetic wave baffle plate 190 can also be electrically connected with the cathode portion 122 of the capacitor unit 120 through the conductive adhesive 140, so as to be grounded. However, in another embodiment, the electromagnetic wave baffle plate 190 may not be electrically connected with the cathode portion 122 of the capacitor unit 120.

Figure 12A:
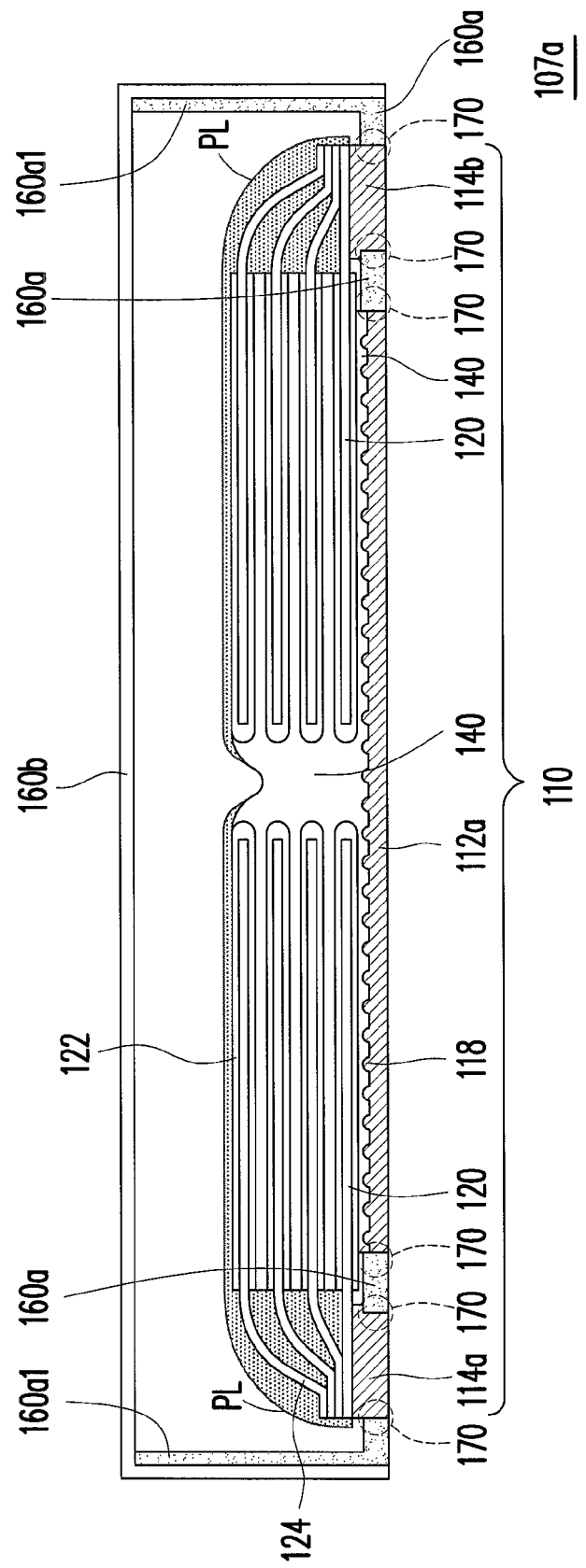
FIG. 12A and FIG. 12B are schematic sectional views of a decoupling device according to yet another two embodiments of the disclosure.
Figure 12B:
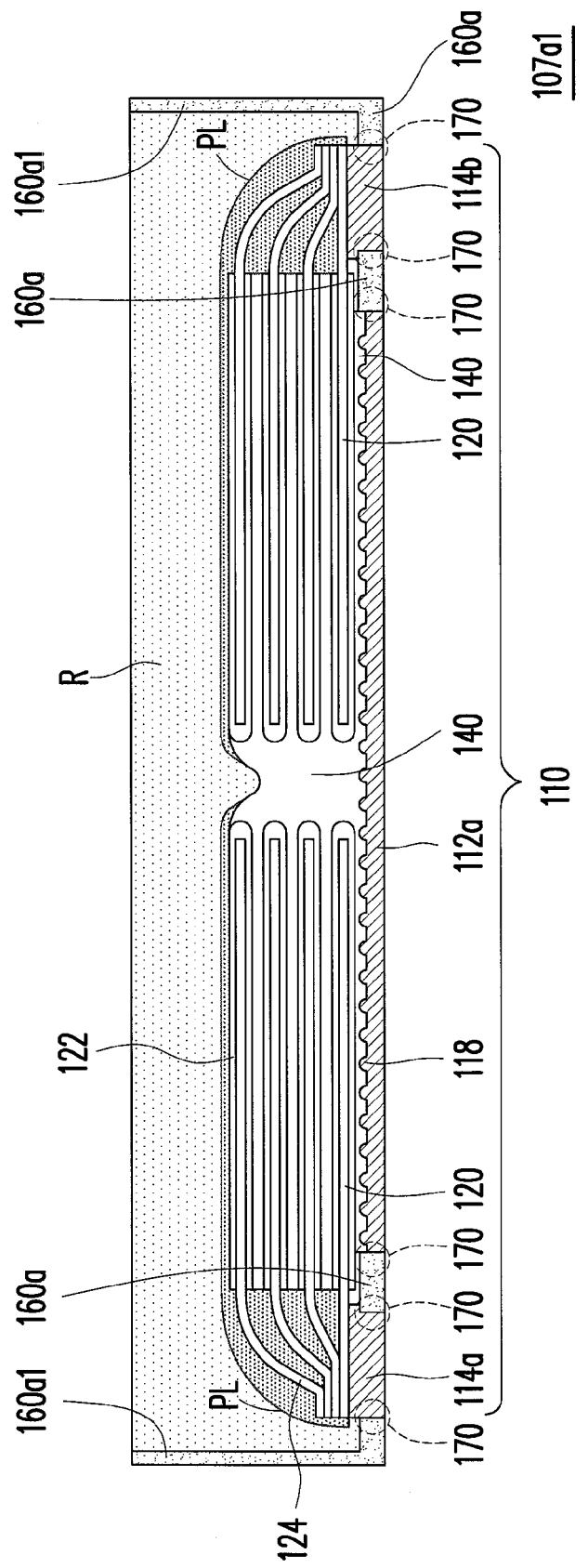

FIG. 12A and FIG. 12B are schematic sectional views of a decoupling device according to yet another two embodiments of the disclosure. Referring to FIG. 12A first, two lid bodies can be utilized to wrap a plurality of capacitor units 120, and the same devices are labelled with the same symbols. As shown in FIG. 12A, in the decoupling device 107a, the packaging element 160 includes: a first lid body 160a and a second lid body 160b opposite to each other. The first lid body 160a and the second lid body 160b wrap the plurality of capacitor units 120, and the first lid body 160a exposes bottom surfaces of the cathode terminal portion 112a and the anode terminal portions 114a and 114b. The packaging element 160 wrapping multiple capacitor units 120 through two lid bodies 160a and 160b has advantages of easy manufacturing and fast assembly.

Referring to FIG. 12B again, a lid body in cooperation with a packaging layer can be utilized to wrap a plurality of capacitor units 120. As shown in FIG. 12B, in a decoupling device 107a1, the packaging element 160 includes: a first lid body 160a and a packaging layer R, and wraps multiple capacitor units 120 through the first lid body 160a and the packaging layer R together. The packaging layer R may be a water-resist resin layer or other similar materials. The packaging layer R is filled into the first lid body 160a to replace the second lid body 160b, and in addition to the advantage of easy manufacturing, water vapor proof characteristics of the decoupling device 107a1 may be further enhanced greatly. Likewise, the first lid body 160a may expose bottom surfaces of the cathode terminal portion 112a, and the anode terminal portions 114a and 114b.

Additionally, the cathode terminal portions 112a and the anode terminal portions 114a and 114b can further include an engaging structure 170, which is disposed at an edge of the cathode terminal portion 112a and edges of the anode terminal portions 114a and 114b, and the engaging structures 170 are engaged in the first lid body 160a. As a result, the engaging structure 170 can be combined with the first lid body 160a, so that the structure of the entire decoupling device 107a is more stable. Furthermore, the first lid body 160a has an additional extending portion 160a1 around the lead frame 110. After the capacitor units 120 are stacked, the second lid body 160b is mounted onto the first lid body 160a.

In the embodiment of FIG. 12, the packaging assembly speed may be enhanced through cooperation of the protective layer PL and the packaging element 160 (the first lid body 160a and the second lid body 160b), and through simple and easy assembly of the first lid body 160a and the second lid body 160b. In FIG. 12, the protective layer PL may simultaneously wrap the cathode portion 122 and the anode portion 124 of the capacitor unit 120. Additionally, in a box body formed of the first lid body 160a and the second lid body 160b, different types of packaging materials may also be further filled.

Figure 13A:
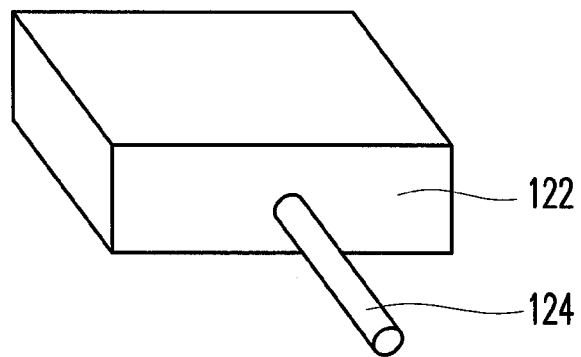
FIG. 13A is a schematic view of a capacitor unit of a decoupling device according to still another embodiment of the disclosure.
Figure 13B:
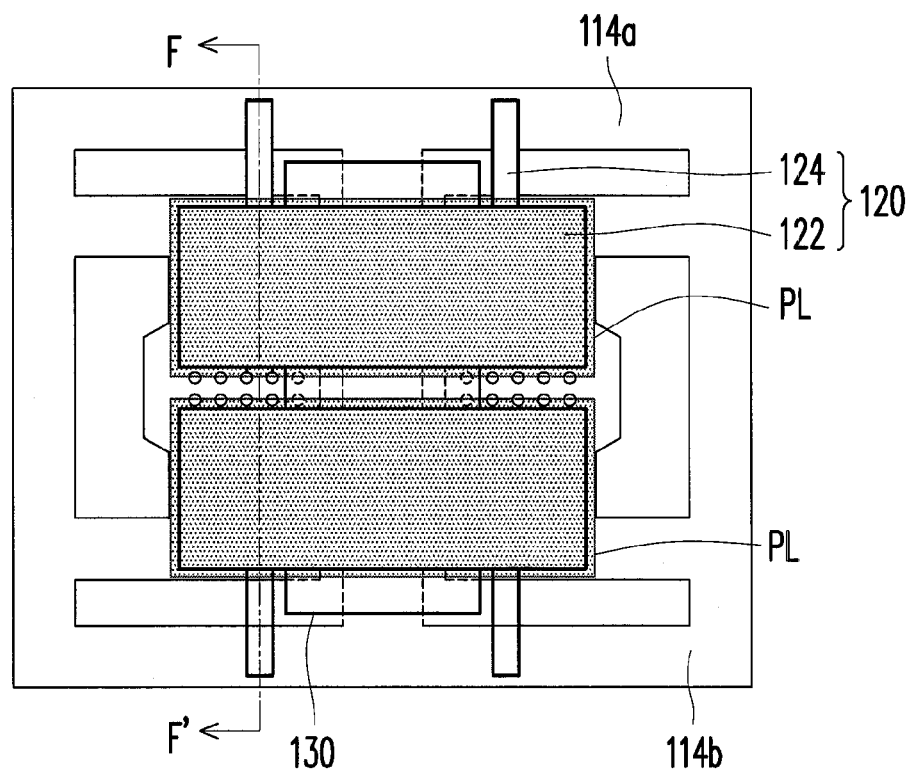
FIG. 13B is a schematic view that the capacitor units on the same plane are disposed on a lead frame.
Figure 13C:
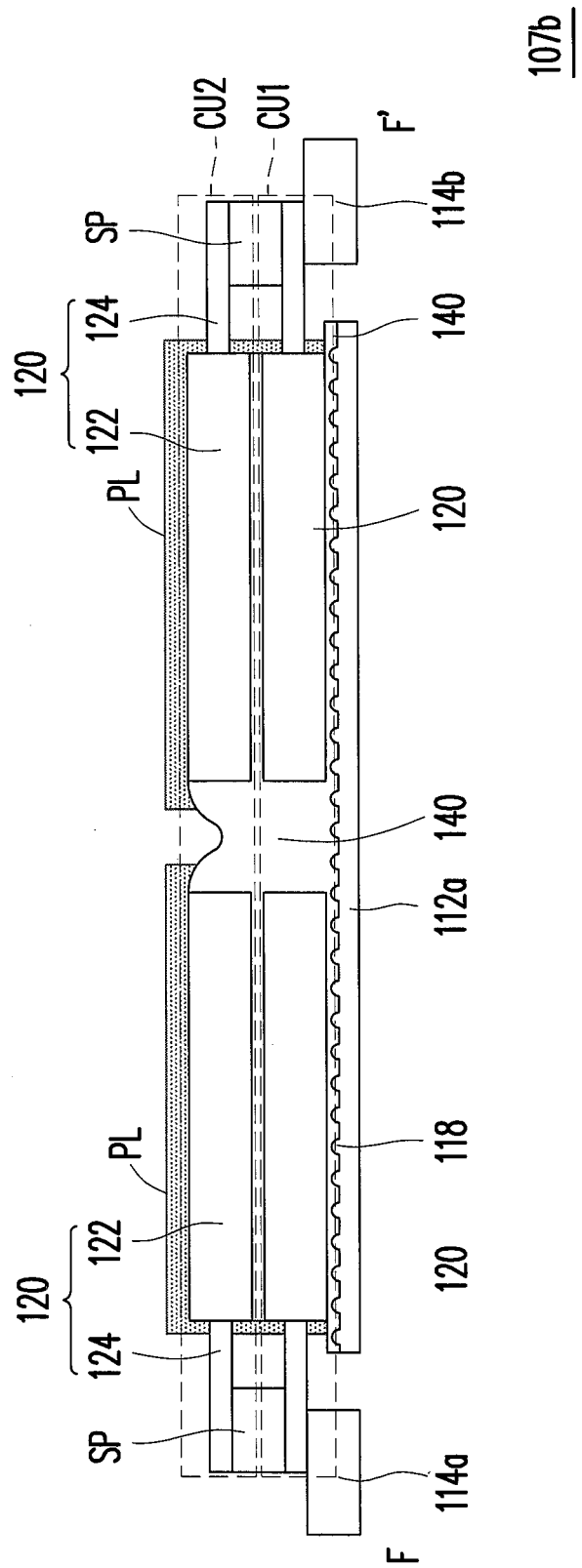
FIG. 13C is a schematic sectional view along the line F-F' in FIG. 13A.

FIG. 13A is a schematic view of a capacitor unit of a decoupling device according to still another embodiment of the disclosure. FIG. 13B is a schematic view that the capacitor units on the same plane are disposed on a lead frame. FIG. 13C is a schematic sectional view along the line F-F' in FIG. 13A. Referring to FIG. 13A to FIG. 13C together, this decoupling device 107b is similar to the decoupling devices 100 in FIG. 1A to FIG. 1C, and FIG. 2A, and the same devices are labelled with the same symbols.

The decoupling device 107b may have a protective layer PL. In FIG. 13B and FIG. 13C, the protective layer PL wrapping a cathode portion 122 of a capacitor unit is taken as an example for illustration. Each capacitor unit 120 is a capacitor unit with a tantalum capacitor, a valve metal layer 120a is made of tantalum metal, a dielectric layer 120b is made of a tantalum oxide, and a cathode conductive layer 120d is made of a carbon paste-silver paste mixture. An anode portion 124 at least includes an extending conductive line, which is electrically connected with an anode terminal portion 114a.

More specifically, the anode portion 124 of the each capacitor unit 120 can be formed as at least one extending conductive line (two as shown in FIG. 13B). However, the anode portion 124 of the each capacitor unit 120 can be formed as more than two extending conductive lines, which is helpful in shortening the conductive path.

Furthermore, referring to FIG. 13C, when the tantalum capacitor is used as the capacitor unit, the height difference is generated between anode portions 124 stacked with each other. Therefore, the decoupling device 107b can further include a plurality of conductive spacers SP located between anode portions 124 of capacitor units 120 of capacitor unit assemblies CU1 and CU2 stacked with each other, so as to compensate the height difference.

The decoupling devices 100 to 107b adopt the multi-terminal structure, which can shorten the current transmission distance between adjacent terminals, so as to reduce the ESL. Furthermore, decoupling devices 100 to 107b have the protective layer PL which may prevent external water vapor and oxygen being applied to the anode portion 124, the cathode portion 122 or the both of the capacitor unit 120, so as to prevent the problem that the anode solder joints are oxidized under the high-temperature and high-humidity condition, and prevent water vapor from infiltrating into a spacing between the conductive polymer layer 120c and the dielectric layer 120b of the capacitor unit 120.

Hereinafter, several embodiments are listed to further illustrate structures of decoupling devices which can effectively reduce the ESL. Likewise, in FIG. 14 to FIG. 17C, the decoupling device is also designed with a protective layer PL, which may wrap at least one of an anode portion 124 and a cathode portion 122 of a capacitor unit. However, in order to avoid a case that it is difficult to distinguish the picture, the protective layer PL is omitted in FIG. 14 to FIG. 17C.

Figure 14:
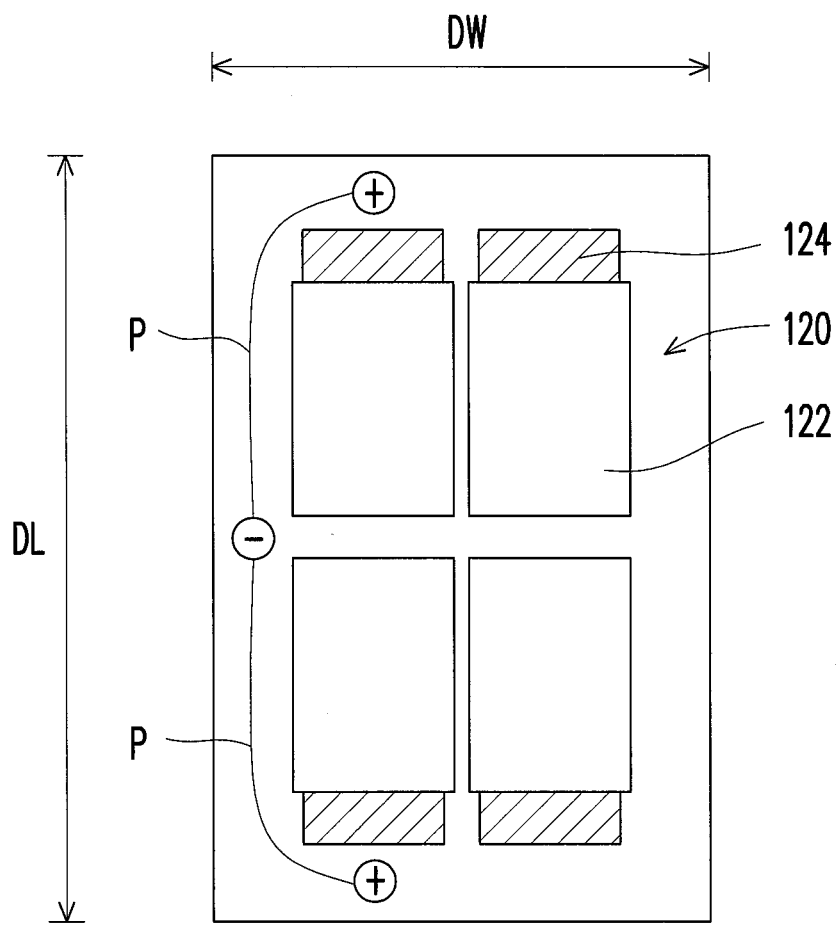
FIG. 14 is a schematic view of the manner in which a plurality of capacitor units of the decoupling device in FIG. 3 is arrayed on the same plane.
Figure 15A:
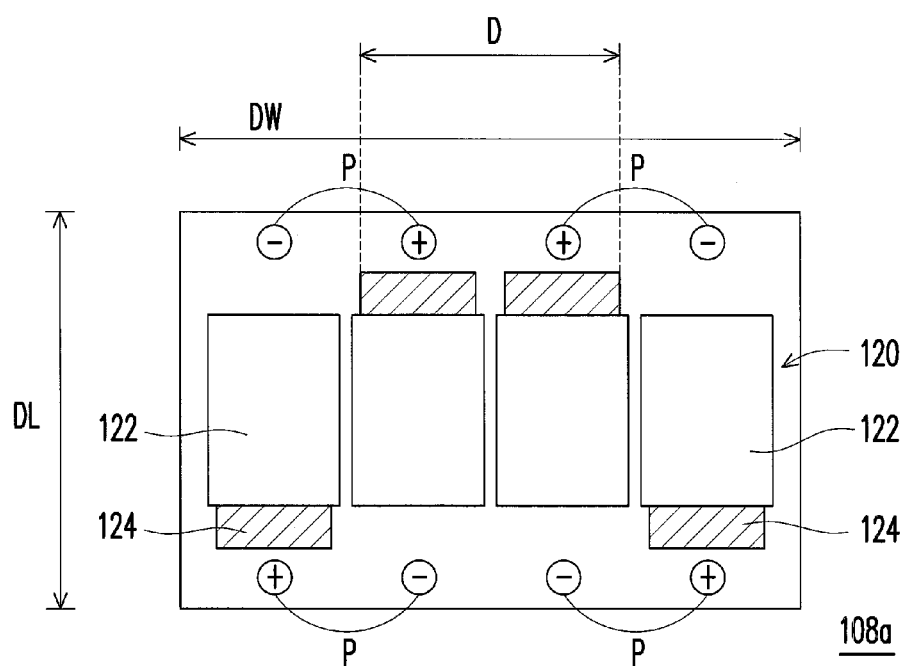
FIG. 15A and FIG. 15B are schematic views of another two manners in which a plurality of capacitor units is arrayed on the same plane.
Figure 15B:
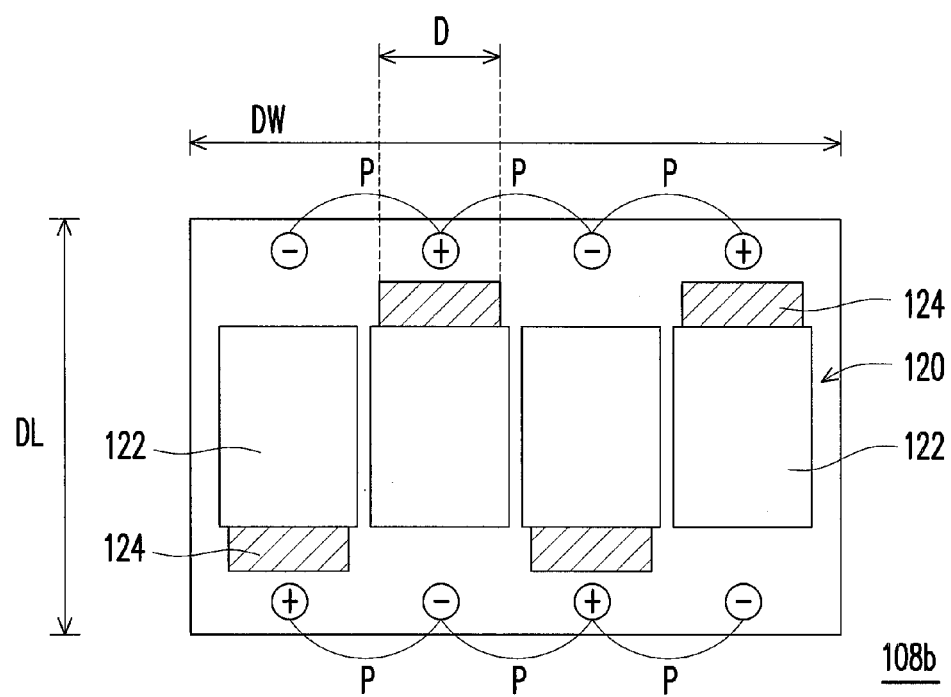

FIG. 14 is a schematic view of the manner in which a plurality of capacitor units of the decoupling device in FIG. 3 is arrayed on the same plane. FIG. 15A and FIG. 15B are schematic views of another two manners in which a plurality of capacitor units is arrayed on the same plane. Referring to FIG. 14 firstly, cathode portions 122 of capacitor units 120 are disposed adjacent to each other in the length direction DL, and anode portions 124 of the capacitor units 120 are disposed adjacent to each other in the width direction DW. It can be seen in FIG. 12 that, a current transmission distance P is formed between a plurality of terminals, that is, the current transmission distance P exists between an anode portion 124 and a cathode portion 122.

Referring to FIG. 15A and FIG. 15B again, the plurality of capacitor units 120 is arrayed in a set direction (that is, the width direction DW), and anode portions 124 of two adjacent capacitor units 120 are staggered with each other in a predetermined spacer number D, where D is larger than or equal to 1.

Comparing FIG. 14 with FIG. 15A and FIG. 15B, in FIG. 15A and FIG. 15B, instead, a side with a longer length is regarded as the width direction DW, and a side with a shorter length is regarded as the length direction DL, that is, FIG. 15A and FIG. 15B show a "reverse type" decoupling device.

More specifically, in a decoupling device 108a in FIG. 15A, an anode portion 124 of a first capacitor unit 120 counting from the left faces down, anode portions 124 of a second capacitor unit 120 and a third capacitor unit 120 counting from the left face up, and an anode portion 124 of a fourth capacitor unit 120 counting from the left faces down; that is to say, every three (the spacer number D is equal to 2) anode portions 124, the anode portion 124 changes the facing direction (up or down) to be staggered with each other. The current transmission path P in FIG. 15A is shorter relative to the current transmission path P in FIG. 12, and the shorter current transmission path P can generate the effect of reducing the ESL.

Likewise, in a decoupling device 108b in FIG. 15B, counting from the left, every other (the spacer number D is equal to 1) anode portion 124 of the capacitor unit 120 changes the facing direction, that is, counting from the left, the anode portions 122 of the capacitor units 120 face down, up, down and up respectively. In this way, besides that the decoupling device 108b in FIG. 15B can shorten the current transmission path P, and relative to a situation that no current transmission exists between part of the capacitor units (two capacitor units 120 in the middle of FIG. 15A) of the decoupling device 108a in FIG. 15A, the decoupling device 108b in FIG. 15B can enable all adjacent capacitor units 120 to play a current transmission role.

It can be known from the foregoing description that, the "reverse type" decoupling devices 108a and 108b in FIG. 15A and FIG. 15B can further shorten the current transmission path P, so as to further reduce the ESL.

Figure 16A:
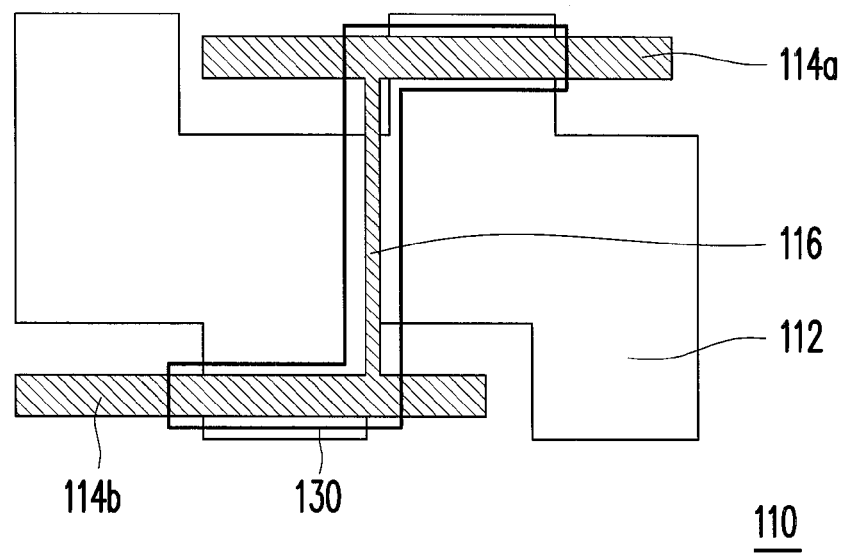
Figure 16B:
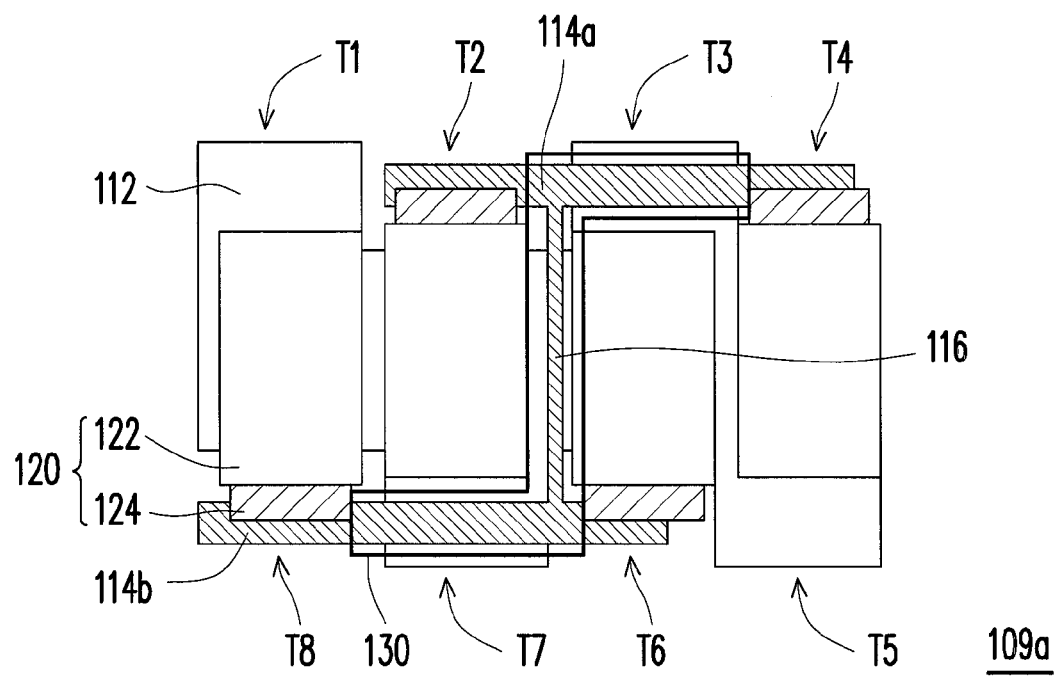
Figure 16C:
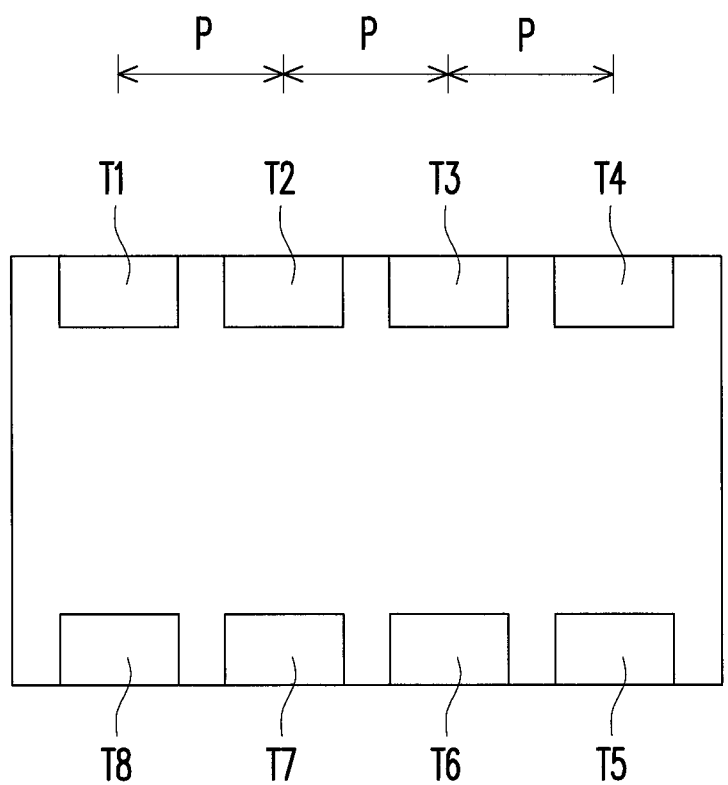

FIG. 16A to FIG. 16C are schematic views of yet another decoupling device having a multi-terminal structure according to an embodiment of the disclosure, in which, FIG. 16A is a schematic view of a lead frame of the decoupling device, FIG. 16B is a schematic view that a plurality of capacitor units on the same plane is arrayed on the lead frame, and FIG. 16C is a schematic view of the decoupling device observed from the bottom surface.

The structure of this decoupling device 109a can be understood by referring to FIG. 16A to FIG. 16C. As shown in FIG. 16A, a lead frame 110 includes a cathode terminal portion 112 and at least two opposite anode terminal portions 114a and 114b disposed at two ends of the cathode terminal portion 112. The two anode terminal portions 114a and 114b are electrically connected with each other through a conductive line 116. The cathode terminal portion 112 and the two anode terminal portions 114a and 114b can form eight terminal structures T1 to T8, and an insulating layer 130 is utilized between two terminal structures to enable the cathode terminal portion 112 and the anode terminal portions 114a and 114b to be electrically insulated from each other.

As shown in FIG. 16B, the plurality of capacitor units 120 is located on the same plane and is arrayed into a capacitor unit assembly in a manner of one group including 4 pieces, so as to form the decoupling device 109a having the eight terminal structures T1 to T8. More specifically, in the embodiment of FIG. 16A to FIG. 16C, the cathode terminal portion 112 and the anode terminal portions 114a and 114b include the eight terminal structures T1 to T8, the terminal structures T1 to T8 are arrayed adjacent to each other, and anode portions 124 and cathode portions 122 of adjacent capacitor units 120 are arrayed alternately.

As shown in FIG. 16C, the number of terminal structures T1 to T8 is increased, so the current transmission path P between two adjacent terminal structures can be shortened, and the ESL can be reduced.

Figure 17A:
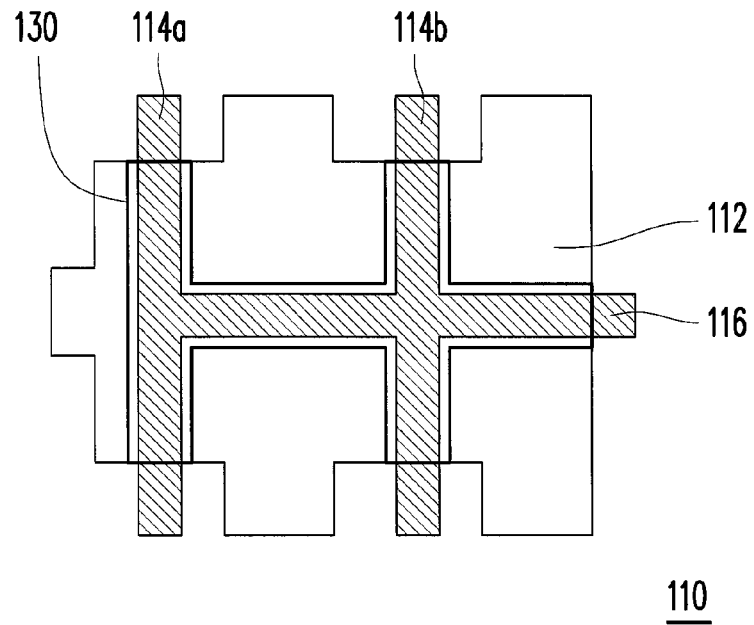
Figure 17B:
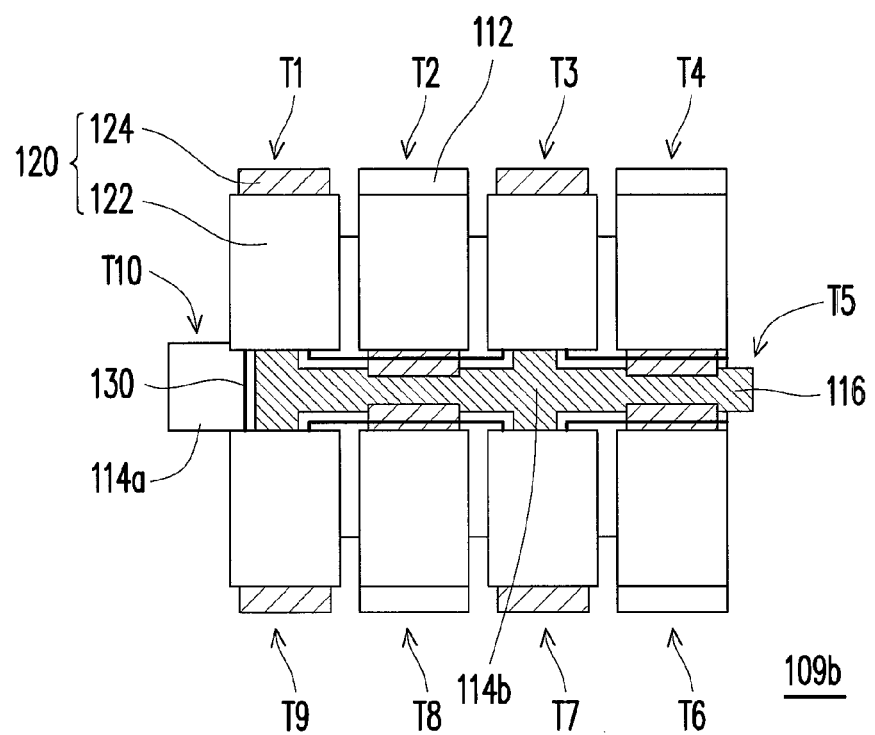
Figure 17C:
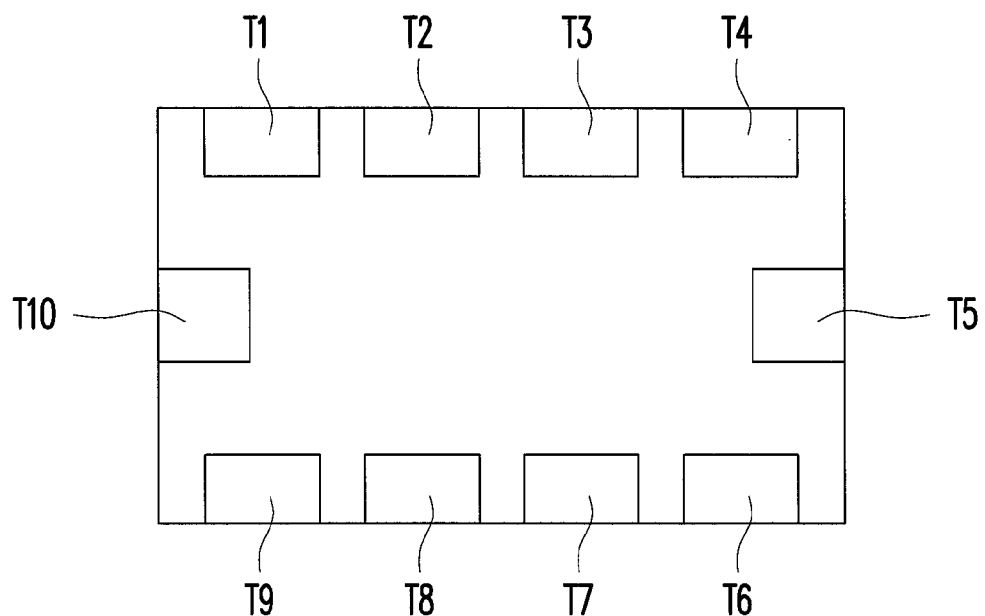

FIG. 17A to FIG. 17C are schematic views of still another decoupling device having a multi-terminal structure according to an embodiment of the disclosure, in which, FIG. 17A is a schematic view of a lead frame of the decoupling device, FIG. 17B is a schematic view that a plurality of capacitor units on the same plane is arrayed on the lead frame, and FIG. 17C is a schematic view of the decoupling device observed from the bottom surface.

The decoupling device 109b in FIG. 17A to FIG. 17C is similar to the decoupling devices 109a in FIG. 16A to FIG. 16C, and FIG. 2A, and the same device is labelled with the same symbol. In FIG. 17A to FIG. 17C, ten terminal structures T1 to T10 are formed in a manner of arraying a lead frame 110 and a plurality of capacitor units 120. The number of terminal structures T1 to T10 is further increased, so the current transmission path P between two adjacent terminal structures can be further shortened, and the ESL can be reduced more effectively.

Figure 18:
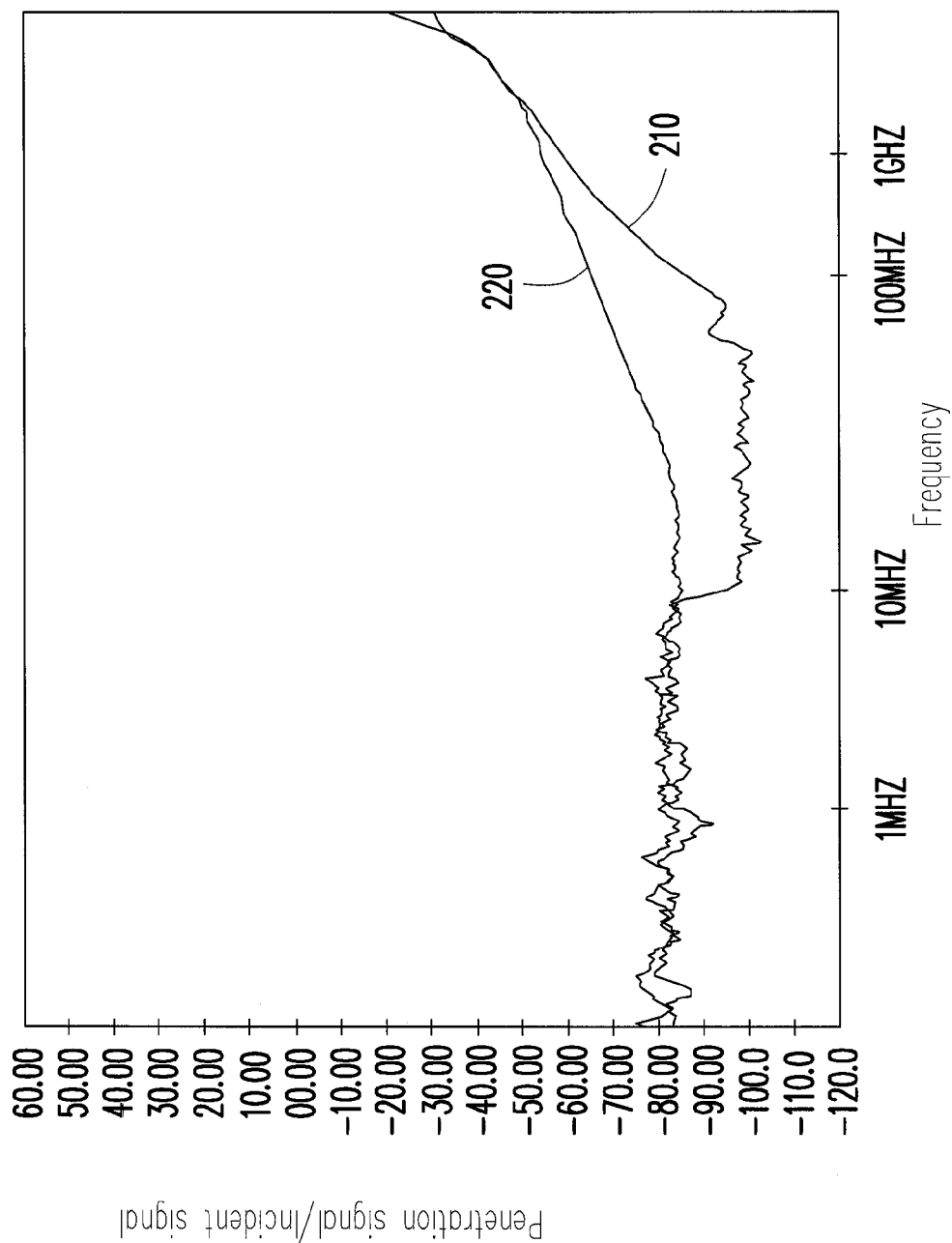
FIG. 18 is a curve comparison diagram of filtering performances of a decoupling device according to an embodiment of the disclosure and a commercially available decoupling device.

FIG. 18 is a curve comparison diagram of filtering performances of a decoupling device according to an embodiment of the disclosure and a commercially available decoupling device.

In the decoupling device according to the embodiment of the disclosure, capacitor units 120 with four pieces as one group are arrayed on the same plane (the arrayed manner is shown in FIG. 3) and are stacked into four layers, and the ESR of this decoupling device is 1 mΩ at 100 KHz, which is represented with a curve 210. A conventional through type decoupling device is represented with a curve 220. In FIG. 18, the vertical axis is a ratio of a penetration signal/an incident signal; the horizontal axis is the operation frequency of the decoupling devices.

Referring to FIG. 18, it can be seen that, when the through type decoupling device (the curve 220) is at a high frequency (more than 100 MHz), the filtering performance apparently deteriorates (the curve 220 is increased upward); however, the decoupling device (the curve 210) according to the embodiment of the disclosure still has an excellent filtering performance (the curve 210 is decreased downward) at a high frequency (100 MHz); that is, compared with the ratio of the through type decoupling device, at a high frequency (more than 100 MHz), the ratio (the penetration signal/the incident signal) of the decoupling device according to the embodiment of the disclosure is lower.

[Decoupling Device of Multiple Capacitor Units Staggered, Stacked, and Arrayed in Parallel]

Figure 19:
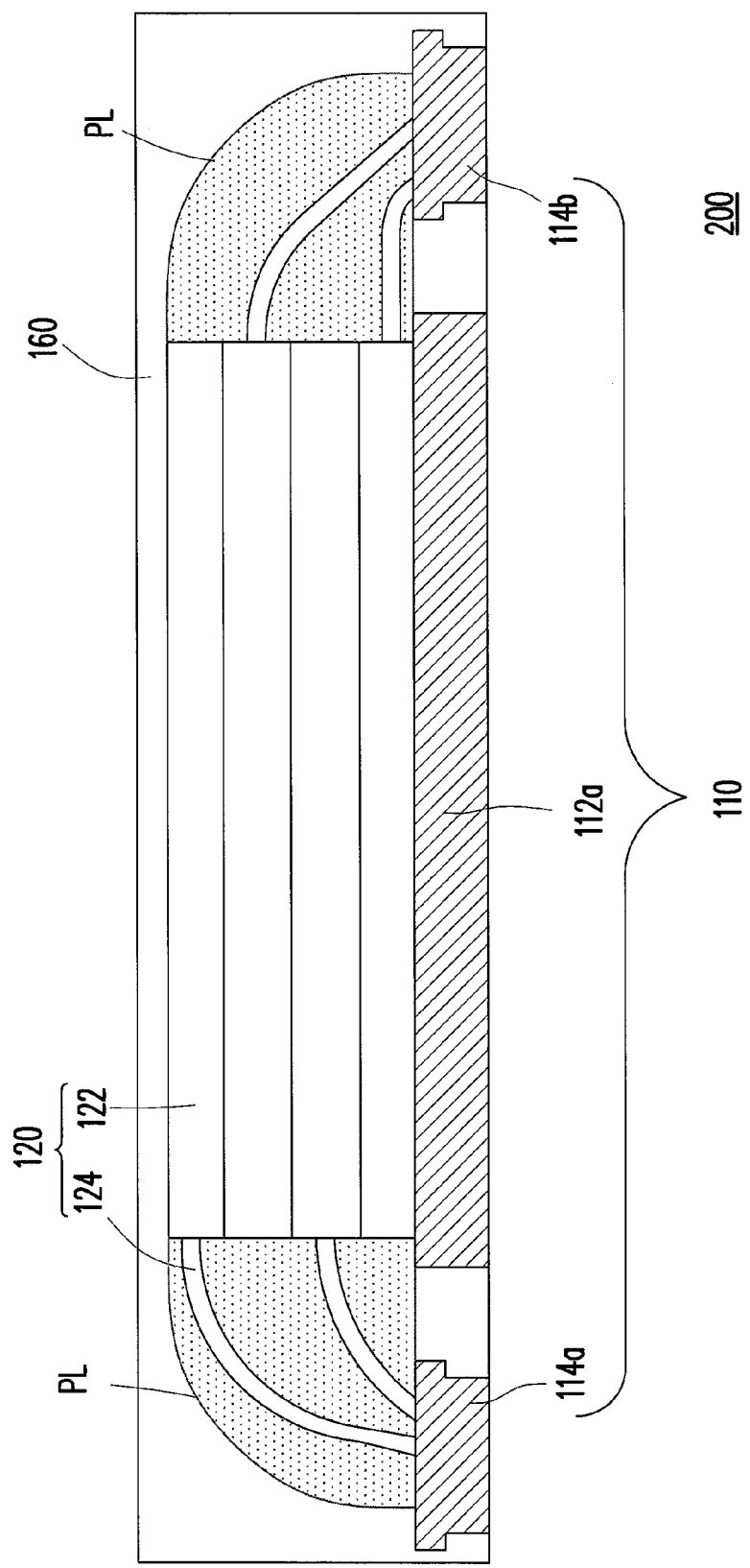
FIG. 19 is a schematic sectional view of a decoupling device according to yet another embodiment of the disclosure.

FIG. 19 is a schematic sectional view of a decoupling device according to yet another embodiment of the disclosure. Referring to FIG. 19, in this decoupling device 200, multiple capacitor units 120 are staggered, stacked, and arrayed in parallel with each other, and disposed on a lead frame 110.

Referring to FIG. 19, the so-called interactive stacked type decoupling device 200 means that: the lead frame 110 has two anode terminal portions 114a and 114b, and a cathode terminal portion 112a located between the two anode terminal portions 114a and 114b. A sheet capacitor unit is used as a capacitor unit 120, and each sheet capacitor unit 120 has one cathode portion 122 and one anode portion 124 opposite to each other. The capacitor units 120 are stacked on the lead frame 110, and the stacking manner of the capacitor units 120 is as follows: sheet capacitor units 120 are alternately stacked with the cathode portion 122 of the capacitor unit 120 as a symmetrical center, and anode portions 124 are disposed in a left-right alternate manner. Furthermore, the cathode portions 122 are electrically connected with the cathode terminal portion 112a, and the anode portions 124 are electrically connected with the anode terminal portion 114a and 114b.

Likewise, the decoupling device 200 may have a protective layer PL and a packaging element 160, which may prevent the problem that anode solder joints are oxidized under a high-temperature and high-humidity condition, and may prevent a false capacitance phenomenon caused by that water vapor infiltrates into a spacing between a conductive polymer layer and a dielectric layer of the capacitor unit 120.

The packaging element 160 of the embodiment of FIG. 7 adopts the packaging layer shown in FIG. 7; however, may also adopt the first lid body 160a and the second lid body 160b showed in FIG. 12.

[Decoupling Device Fabricating Method]

Figure 20:
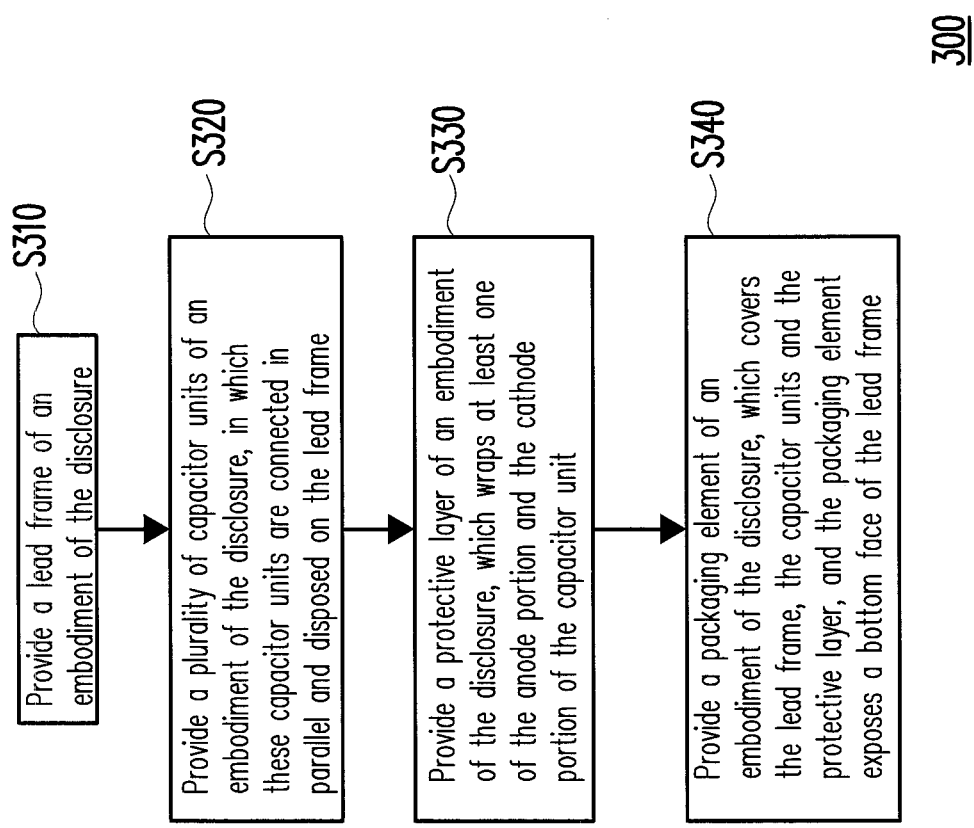
FIG. 20 is a schematic flowchart of steps of a decoupling device fabricating method according to an embodiment of the disclosure.

FIG. 20 is a schematic flowchart of steps of a decoupling device fabricating method according to an embodiment of the disclosure. Referring to FIG. 20, a decoupling device fabricating method 300 includes steps S310 to S340.

The decoupling device fabricating method of the embodiment of the disclosure may be understood by referring to any decoupling device shown in FIG. 1 to FIG. 19.

First, in step S310, a lead frame is provided, which includes a cathode terminal portion and at least two opposite anode terminal portions disposed at two ends of the cathode terminal portion. The two anode terminal portions are electrically connected with each other through a conductive line.

Then, in step S320, a plurality of capacitor units is provided, and these capacitor units are connected in parallel and disposed on the lead frame. Each capacitor unit has a cathode portion and an anode portion opposite to each other. The cathode portion of the capacitor unit is electrically connected with the cathode terminal portion. The anode portion of the capacitor unit is electrically connected with the anode terminal portion.

Subsequently, in step S330, a protective layer is provided, which wraps at least one of the anode portion and the cathode portion of the capacitor unit.

Afterwards, in step S340, a packaging element is provided, which covers the lead frame, the capacitor units and the protective layer, and the packaging element exposes a bottom surface of the lead frame.

In the decoupling device fabricating method 300, detailed illustration about any element is described in detail in FIG. 1 to FIG. 19, and is not repeated herein.

Table 1 illustrates yield changes obtained after an anode portion of a decoupling device is subject to a high-temperature and high-humidity treatment process; value comparison of manufacturing yields obtained after a decoupling device applied with a protective layer and a decoupling device applied with no protective layer are subject to different high-temperature and high-humidity environments can be seen, in which, + denotes that a protective layer wraps an anode portion of a capacitor unit only, and +− denotes that a protective layer wraps both an anode portion and a cathode portion of a capacitor unit.

TABLE 1

|  | Material of protective layer | Manufacturing yield (%) |
| --- | --- | --- |
| Comparative example | No | 47% |
| Example 1 | Silicon rubber (+) | 33% |
| Example 2 | silicon rubber (+−) | 66% |
| Example 3 | Silicon resin (+) | 100% |
| Example 4 | Silicon resin (+−) | 91% |
| Example 5 | Epoxy resin (+−) | 90% |

It can be seen from Table 1 that, if there is a protective layer protecting an anode portion, even if the anode portion is subject to the high-temperature and high-humidity treatment, a certain manufacturing yield still can be maintained (such as examples 3 to 5). Additionally, it can be known by comparing examples 1 to 2 with examples 3 to 5 that, water vapor proof characteristics of the used material also influence the manufacturing yield.

Table 2 illustrates changes of the false capacitance caused by water vapor entering a cathode portion of a decoupling device after the cathode portion is subject to a high-temperature and high-humidity treatment process. Value comparison of capacitances obtained after a decoupling device applied with a protective layer and a decoupling device applied with no protective layer are subject to different high-temperature and high-humidity environments can be seen, in which, + denotes that a protective layer wraps an anode portion of a capacitor unit only, and +− denotes that a protective layer wraps both an anode portion and a cathode portion of a capacitor unit.

TABLE 2

| | Material of protective layer | Drying for 2 hours at 150° C.; placed in vacuum for 8 hours | Placed under an environment of 90° C. and relative humidity of 95% for 2 hours to be tested | Placed under an environment of 90° C. and relative humidity of 95% for 4 hours to be tested |
| --- | --- | --- | --- | --- |
| Comparative example | No | 100 | 113 | 116 |
| Example 1 | Silicon rubber (+) | 100 | 105 | 105 |
| Example 2 | silicon rubber (+−) | 100 | 106 | 106 |
| Example 3 | Silicon resin (+) | 100 | 108 | 108 |
| Example 4 | Silicon resin (+−) | 100 | 103 | 104 |
| Example 5 | Epoxy resin (+−) | 100 | 102 | 103 |

It can be seen from Table 2 that, if there is a protective layer protecting an anode portion and a cathode portion, even if the anode portion and the cathode portion are subject to the high-temperature and high-humidity treatment, false capacitance generation may be constrained, (such as examples 1 to 5). If there is no protective layer protecting an anode portion and a cathode portion, the false capacitance caused by water vapor is higher (such as the comparative example).

In brief, after the decoupling device is packaged, then under an environment of 90° C. and relative humidity of 95%, a voltage of 6.3 volts is applied to the decoupling device for testing for 2 to 6 hours; then, after the decoupling device is subject to heat treatment at 105° C. in vacuum, characteristics of the decoupling device are measured, and capacitance change ratios are compared.

It is shown from results of Table 1 and Table 2 that, if the capacitance value measured after drying for 2 hours at 150° C. and being placed in vacuum for 8 hours is set to 100, in a constant-temperature and constant-humidity environment, the capacitance change extent of samples of a decoupling device filled with a protective layer (example 1 to example 3) may be less than 8%; and the capacitance change extent of a decoupling device filled with no protective layer (comparative example) is larger than 16% (a result caused by existence of the false capacitance).

Additionally, manufacturing process yields of samples of example 1 to example 3 are also effectively enhanced, and may be enhanced to more than 90% at most; but the manufacturing process yield of the decoupling device filled with no protective layer of the comparative example is as low as 47% (because damages to internal elements are increased due to water vapor and high temperature).

Accordingly, it can be known that, in the embodiment of the disclosure, the decoupling device using a protective layer may achieve considerably superior technical effects, and compared with a decoupling device without a protective layer, the decoupling device of the embodiment of the disclosure may greatly improve the capacitance stability and the device manufacturing yield.

Figure 21:
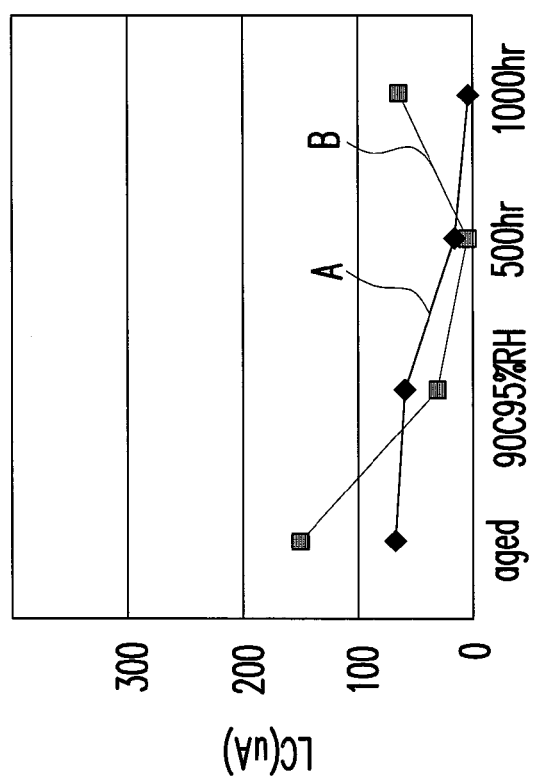
FIG. 21 is a curve diagram of leakage currents (LCs) of a decoupling device having a protective layer and a decoupling device having no protective layer according to this embodiment.

FIG. 21 is a curve diagram of leakage currents (LCs) of a decoupling device having a protective layer and a decoupling device having no protective layer according to this embodiment. Referring to FIG. 21, the longitudinal axis denotes a value (μA) of an LC, and the transverse axis denotes the LC of the decoupling device applied with the voltage of 6.3 volts in the test situations such as aged, 90° C. and 95% RH, high temperature of 105° C. for 500 hours, and high temperature of 105° C. for 1000 hours, in which test conditions are consecutive and are accumulated from left to right.

Referring to FIG. 21, a curve A denotes the LC of the decoupling device having a protective layer of the embodiment of the disclosure, and a curve B denotes the LC of the decoupling device having no protective layer; it can be known by comparing the curve A with the curve B that, the LC of the decoupling device having a protective layer of this embodiment is lower, and as test time passes longer (1,000 hours), the LC of the decoupling device having a protective layer of the embodiment of the disclosure is considerably low.

Figure 22:
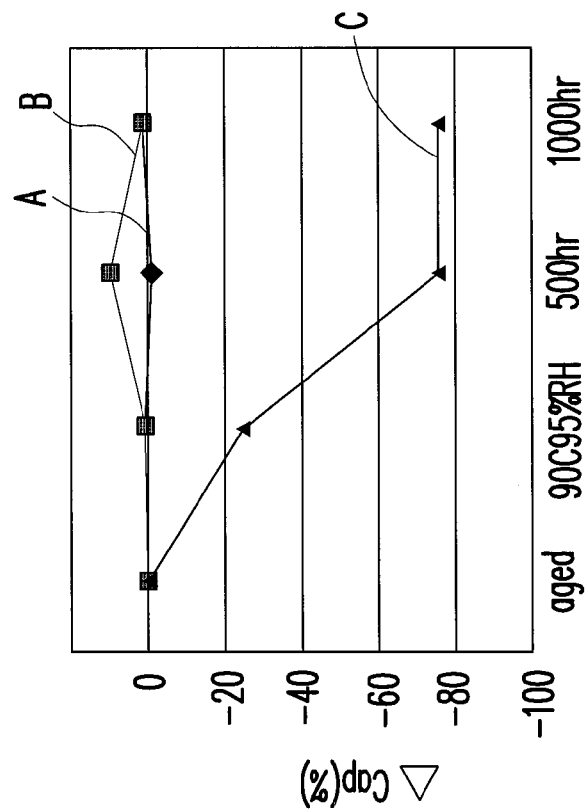
FIG. 22 is a curve diagram of capacitances of a decoupling device having a protective layer, a qualified product of a decoupling device having no protective layer, and an unqualified product of a decoupling device having no protective layer according to this embodiment.

FIG. 22 is a curve diagram of capacitance change percentages of a decoupling device having a protective layer, a qualified product of a decoupling device having no protective layer, and an unqualified product of a decoupling device having no protective layer according to this embodiment. Referring to FIG. 22, the longitudinal axis denotes a value (%) of a capacitance change percentage (ΔCap), and the transverse axis denotes the capacitance change percentage of the decoupling device applied with the voltage of 6.3 volts in the test under situations such as aged, 90° C. and 95% RH, high temperature of 105° C. for 500 hours, and high temperature of 105° C. for 1000 hours, in which test conditions are consecutive and are accumulated from left to right.

Referring to FIG. 22, a curve A denotes the capacitance change percentage curve of the decoupling device having a protective layer of the embodiment of the disclosure, a curve B denotes the capacitance change percentage curve of the decoupling device (qualified product) having no protective layer, and a curve C denotes the capacitance change percentage curve of the decoupling device (unqualified product) having no protective layer. It can be known by comparing the curve A, the curve B with the curve C that, the capacitance change percentage curve variation of the decoupling device having a protective layer of this embodiment is the lowest, while the capacitance change percentage curve variation of curve C is the largest. Additionally, the curve B of the capacitance change percentage curve of the decoupling device (qualified product) having no protective layer also slightly varies. Accordingly, it can be known that, the decoupling device of the embodiment of the disclosure has stable capacitance changes.

Figure 23:
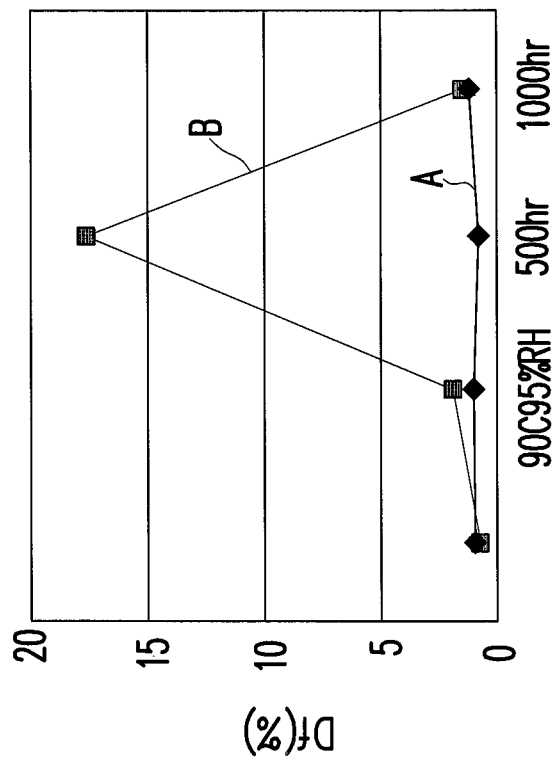
FIG. 23 is a curve diagram of DFs of a decoupling device having a protective layer and a decoupling device having no protective layer according to this embodiment.
Figure 25:
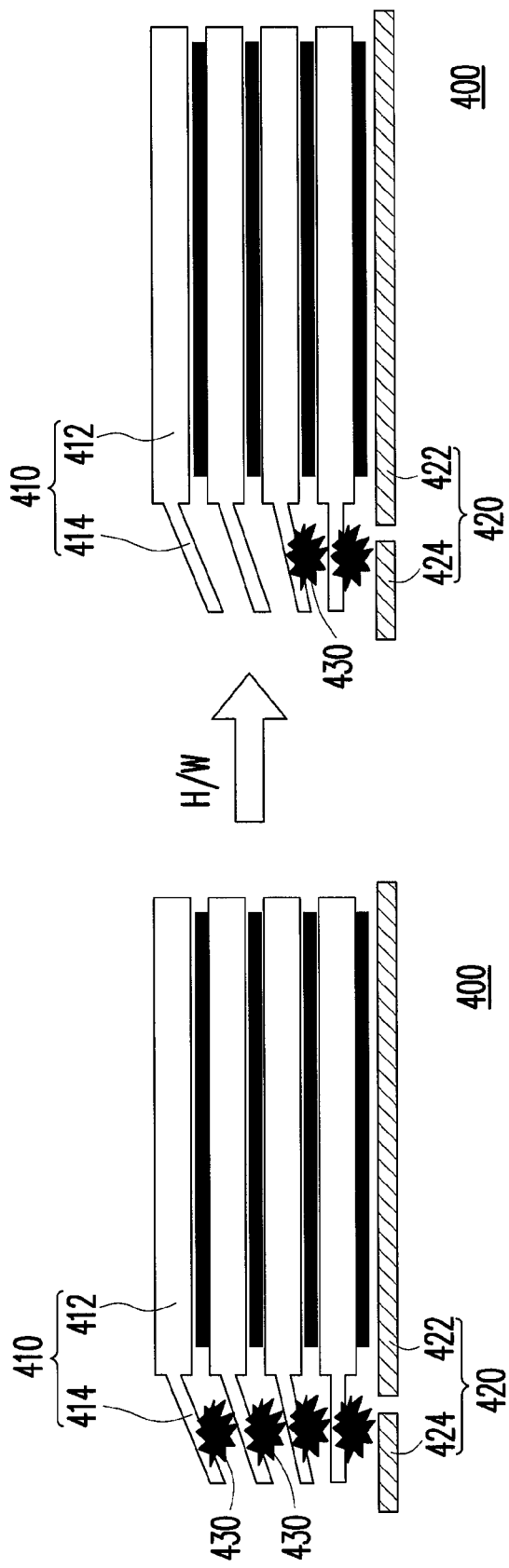
FIG. 25 is a local schematic view of a conventional solid electrolytic capacitor.

FIG. 23 is a curve diagram of DFs of a decoupling device having a protective layer and a decoupling device having no protective layer according to this embodiment. Referring to FIG. 23, the longitudinal axis denotes a percentage (%) of a DF, and the transverse axis denotes the DF of the decoupling device applied with the voltage of 6.3 volts in the test under situations such as aged, 90° C. and 95% RH, high temperature of 105° C. for 500 hours, and high temperature of 105° C. for 1000 hours, in which test conditions are consecutive and are accumulated from left to right. The DF is energy consumed by the decoupling device due to heat generation within unit time under the action of an electric field.

Referring to FIG. 23, a curve A denotes the DF of the decoupling device having a protective layer of the embodiment of the disclosure, and a curve B denotes the DF of the decoupling device having no protective layer; it can be known by comparing the curve A with the curve B that, the DF of the decoupling device having a protective layer of this embodiment is lower, and the DF of the decoupling device having no protective layer is higher, in which the DF under the state of high temperature of 105° C. for 500 hour is considerably high.

Figure 24:
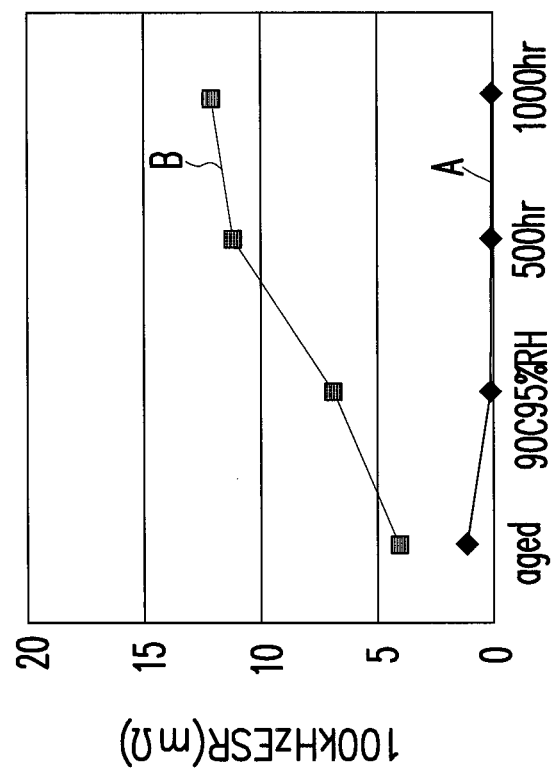
FIG. 24 is a curve diagram of equivalent series resistances (ESRs) of a decoupling device having a protective layer and a decoupling device having no protective layer according to this embodiment.

FIG. 24 is a curve diagram of equivalent series resistances (ESRs) of a decoupling device having a protective layer and a decoupling device having no protective layer according to this embodiment. Referring to FIG. 24, the longitudinal axis denotes a value (mΩ) of an ESR of a decoupling device running under the state of 100 kHz, and the transverse axis denotes the ESR of the decoupling device applied with the voltage of 6.3 volts in the test under situations such as aged, 90° C. and 95% RH, high temperature of 105° C. for 500 hours, and high temperature of 105° C. for 1000 hours, in which test conditions are consecutive and are accumulated from left to right.

Referring to FIG. 24, a curve A denotes the ESR of the decoupling device having a protective layer of the embodiment of the disclosure, and a curve B denotes the ESR of the decoupling device having no protective layer; it can be known by comparing the curve A with the curve B that, the ESR of the decoupling device having a protective layer of this embodiment is lower, and the ESR of the decoupling device having no protective layer is higher.

In view of the foregoing description, the decoupling device according to the disclosure at least has the following advantages.

A protective layer covers at least one of an anode portion and a cathode portion of a capacitor unit, and the protective layer is located between the capacitor unit and a packaging element, thereby being capable of effectively preventing water vapor and heat energy from outside entering anode solder joints between anode portions, and further preventing water vapor entering a spacing between a conductive polymer layer and a dielectric layer of the capacitor unit, so as to ensure that the decoupling device has good device characteristics.

Additionally, a plurality of capacitor units may be stacked on a lead frame in a manner that the capacitor units are arrayed on the same plane and are connected in parallel with each other, or in a manner that the capacitor units are staggered, stacked, and arrayed in parallel with each other, in which, the manner that the capacitor units are arrayed on the same plane and are connected in parallel with each other is considerably simple, and may effectively reduce the ESR.

Additionally, the decoupling device can form the multi-terminal structure by designing the arraying manner of the lead frame and the capacitor units, and in this way, the current transmission path between the plurality of terminals can be shortened, so as to reduce the ESL.

Furthermore, the transmission line structure formed between two anode portions of the decoupling device can be utilized. This transmission line structure can generate an inductor during the operation at a high frequency, and the inductor and capacitors form an equivalent filtering circuit, so as to further enable the decoupling device to have the filtering efficacy.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A decoupling device, comprising:
   a lead frame, comprising: a cathode terminal portion and at least two opposite anode terminal portions disposed at two ends of the cathode terminal portion, wherein the two anode terminal portions are electrically connected with each other through a conductive line, and the lead frame has a first horizontal plane;
   a plurality of capacitor units, wherein the capacitor units are connected with each other in parallel and disposed on the lead frame, each of the capacitor units is provided with a cathode portion and an anode portion opposite to each other, the cathode portion of the capacitor unit is electrically connected with the cathode terminal portion, and the anode portion of the capacitor unit is electrically connected with the anode terminal portion, the plurality of the capacitor units are arrayed into a capacitor unit assembly in a manner of pieces as one group along a second horizontal plane which is parallel with the first horizontal plane;
   a protective layer, for wrapping at least one of the anode portion and the cathode portion of the capacitor unit entirely; and
   a packaging element, for covering the lead frame, the capacitor units and the protective layer, wherein the packaging element exposes a bottom surface of the lead frame.

2. The decoupling device of according to claim 1, wherein a material of the protective layer PL is selected from silicon resin, silicon rubber, epoxy resin, polyimide, polytetrafluoroethylene, polyurethane, liquid crystal plastic and a combination thereof.

3. The decoupling device according to claim 1, further comprising: a plurality of conductive spacers, located between the anode portions of the capacitor units stacked with each other.

4. The decoupling device of according to claim 1, wherein the cathode terminal portion is provided with a spacing, and the conductive line is disposed in the spacing.

5. The decoupling device of according to claim 1, wherein the conductive line is a consecutive bending structure.

6. The decoupling device according to claim 1, further comprising: a device with inductance characteristics, connected with the conductive line in series or in parallel.

7. The decoupling device of according to claim 1, wherein the cathode terminal portion further comprises a rough structure located at a surface of the cathode terminal portion.

8. The decoupling device of according to claim 1, wherein the packaging element is a packaging layer, the packaging layer partially wraps the capacitor units and the lead frame, and the packaging layer exposes bottom surfaces of the cathode terminal portion and the anode terminal portions.

9. The decoupling device according to claim 8, wherein the cathode terminal portion and each of the anode terminal portions further comprise: an engaging structure, disposed at an edge of the cathode terminal portion and edges of the anode terminal portions, and engaged in the packaging layer.

10. The decoupling device according to claim 8, wherein the packaging layer completely wraps the conductive line, or exposes part of the conductive line.

11. The decoupling device according to claim 1, wherein the packaging element comprises: a first lid body and a second lid body opposite to each other, the first lid body and the second lid body wrap the capacitor units, and the first lid body exposes bottom surfaces of the cathode terminal portion and the anode terminal portions.

12. The decoupling device according to claim 11, wherein the cathode terminal portion and each of the anode terminal portions further comprise: an engaging structure, disposed at an edge of the cathode terminal portion and edges of the anode terminal portions, and engaged in the first lid body.

13. The decoupling device of according to claim 1, wherein the packaging element comprises: a first lid body and a packaging layer, the first lid body exposes bottom surfaces of the cathode terminal portion and the anode terminal portions, the packaging layer is filled into the first lid body, and the first lid body and the packaging layer wrap the capacitor units.

14. The decoupling device according to claim 1, further comprising: at least one ceramic capacitor, connected between the cathode terminal portion and the anode terminal portions in parallel.

15. The decoupling device according to claim 1, further comprising: an electromagnetic wave baffle plate, covering the capacitor units at the above of the capacitor units.

16. The decoupling device according to claim 15, wherein the electromagnetic wave baffle plate is electrically connected with the capacitor units.

17. The decoupling device according to claim 1, wherein each of the capacitor units comprises:
a valve metal layer;
a dielectric layer, formed on the valve metal layer;
a conductive polymer layer, formed on the dielectric layer; and
a cathode conductive layer, formed on the conductive polymer layer.

18. The decoupling device according to claim 17, wherein each of the capacitor units is a capacitor unit with a tantalum capacitor,
the valve metal layer is made of tantalum metal, the dielectric layer is made of a tantalum oxide, the cathode conductive layer is made of a carbon paste-silver paste mixture, and
the anode portion at least comprises an extending conductive line electrically connected with the anode terminal portion.

19. The decoupling device of according to claim 17, wherein a material of the valve metal layer is selected from aluminium, tantalum, niobium, niobium oxide, titanium and a combination thereof, and the dielectric layer is a metal oxide of the valve metal layer.

20. The decoupling device according to claim 1, further comprising: an insulating layer, disposed above the conductive line, wherein the insulating layer enables the cathode terminal portion and the anode terminal portions to be electrically insulated from each other.

21. The decoupling device according to claim 1, wherein the capacitor units are arrayed in a set direction, the anode portions of the two adjacent capacitor units are staggered with each other in a predetermined spacer number D, and D is larger than or equal to 1.

22. The decoupling device according to claim 1, wherein the cathode terminal portion and the anode terminal portions comprise a plurality of terminal structures, the terminal structures are arrayed adjacent to each other, and the anode portions and the cathode portions of the adjacent capacitor units are arrayed alternately.

23. A decoupling device fabricating method, comprising:
providing a lead frame comprising: a cathode terminal portion and at least two opposite anode terminal portions disposed at two ends of the cathode terminal portion, wherein the two anode terminal portions are electrically connected with each other through a conductive line, and the lead frame has a first horizontal plane;
providing a plurality of capacitor units, wherein the capacitor units are connected with each other in parallel and disposed on the lead frame, each of the capacitor units is provided with a cathode portion and an anode portion opposite to each other, the cathode portion of the capacitor unit is electrically connected with the cathode terminal portion, and the anode portion of the capacitor unit is electrically connected with the anode terminal portion, the plurality of the capacitor units are arrayed into a capacitor unit assembly in a manner of pieces as one group along a second horizontal plane which is parallel with the first horizontal plane;
providing a protective layer for wrapping at least one of the anode portion and the cathode portion of the capacitor unit entirely; and
providing a packaging element for covering the lead frame, the capacitor units and the protective layer, wherein the packaging element exposes a bottom surface of the lead frame.

* * * * *